(12) United States Patent
Cox et al.

(10) Patent No.: US 10,836,953 B2
(45) Date of Patent: *Nov. 17, 2020

(54) POLYSACCHARIDE COATED NANOPARTICLE COMPOSITIONS COMPRISING IONS

(71) Applicant: Saudi Arabian Oil Company, Dhahran (SA)

(72) Inventors: Jason R. Cox, Ashland, MA (US); Hooisweng Ow, Woburn, MA (US); Shannon L. Eichmann, Somerville, MA (US); Howard K. Schmidt, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/375,257

(22) Filed: Apr. 4, 2019

(65) Prior Publication Data
US 2019/0225872 A1    Jul. 25, 2019

Related U.S. Application Data

(60) Continuation of application No. 16/035,033, filed on Jul. 13, 2018, now Pat. No. 10,308,865, which is a (Continued)

(51) Int. Cl.
*C09K 8/588* (2006.01)
*C09K 8/03* (2006.01)
(Continued)

(52) U.S. Cl.
CPC ............... *C09K 8/588* (2013.01); *C09K 8/03* (2013.01); *C09K 8/42* (2013.01); *C09K 8/44* (2013.01);
(Continued)

(58) Field of Classification Search
None
See application file for complete search history.

(56) References Cited

U.S. PATENT DOCUMENTS 6,250,848 B1   6/2001  Moridis et al.
8,269,501 B2   9/2012  Schmidt et al.
(Continued)

FOREIGN PATENT DOCUMENTS

EP        1721603      11/2006
WO     2011063023       5/2011
(Continued)

OTHER PUBLICATIONS

Bagaria et al., "Iron Oxide Nanoparticles Grafted with Sulfonated Copolymers are Stable in Concentrated Brine at Elevated Temperatures and Weakly Adsorb on Silica," ACS Applied Materials & Interfaces, vol. 5, No. 8, Mar. 25, 2013, pp. 3329-3339.
(Continued)

*Primary Examiner* — John J Figueroa
(74) *Attorney, Agent, or Firm* — Fish & Richardson P.C.

(57) ABSTRACT

A composition including a coated nanoparticle including a nanoparticle and a cross-linked carbohydrate-based coating and an ion selected from the group consisting of $Li^+$, $Na^+$, $K^+$, $Rb^+$, $Cs^+$, $Be^{2+}$, $Mg^{2+}$, $Ca^{2+}$, $Sr^{2+}$, $Ba^{2+}$, and mixtures thereof; methods of making and using the composition; and systems including the composition.

13 Claims, 9 Drawing Sheets

Related U.S. Application Data division of application No. 15/205,774, filed on Jul. 8, 2016, now Pat. No. 10,273,399.

(60) Provisional application No. 62/191,881, filed on Jul. 13, 2015.

(51) Int. Cl.

| | | |
|---|---|---|
| *C09K 8/42* | (2006.01) | |
| *C09K 8/516* | (2006.01) | |
| *C09K 8/52* | (2006.01) | |
| *C09K 8/70* | (2006.01) | |
| *C09K 8/72* | (2006.01) | |
| *C09K 8/92* | (2006.01) | |
| *C09K 8/44* | (2006.01) | |
| *E21B 21/00* | (2006.01) | |
| *E21B 33/14* | (2006.01) | |
| *E21B 43/26* | (2006.01) | |
| *E21B 37/00* | (2006.01) | |

(52) U.S. Cl.
CPC ............... *C09K 8/516* (2013.01); *C09K 8/52* (2013.01); *C09K 8/70* (2013.01); *C09K 8/72* (2013.01); *C09K 8/92* (2013.01); *E21B 21/003* (2013.01); *E21B 33/14* (2013.01); *E21B 37/00* (2013.01); *E21B 43/26* (2013.01); *C09K 2208/10* (2013.01)

(56) References Cited

U.S. PATENT DOCUMENTS

| | | |
|---|---|---|
| 8,638,104 B2 | 1/2014 | Barber et al. |
| 8,877,954 B2 | 11/2014 | Giesenberg et al. |
| 9,080,097 B2 | 7/2015 | Gupta et al. |
| 9,133,709 B2 | 9/2015 | Huh et al. |
| 10,273,399 B2 | 4/2019 | Cox |
| 10,308,895 B2 | 6/2019 | Cox |
| 2003/0220204 A1 | 11/2003 | Baran et al. |
| 2006/0105052 A1 | 5/2006 | Acar et al. |
| 2007/0114030 A1 | 5/2007 | Todd et al. |
| 2009/0277625 A1 | 11/2009 | Bai et al. |
| 2011/0030949 A1 | 2/2011 | Weaver et al. |
| 2012/0135080 A1 | 5/2012 | Bromberg et al. |
| 2013/0109261 A1 | 5/2013 | Koene |
| 2013/0244914 A1 | 9/2013 | Wu et al. |
| 2013/0296453 A1 | 11/2013 | Giesenberg et al. |
| 2013/0312970 A1 | 11/2013 | Lafitte et al. |
| 2013/0341030 A1 | 12/2013 | Brannon et al. |
| 2014/0060832 A1 | 3/2014 | Mahoney et al. |
| 2014/0190700 A1 | 7/2014 | Tang et al. |
| 2015/0013983 A1 | 1/2015 | Alwattari |
| 2015/0050741 A1 | 2/2015 | Tour et al. |
| 2015/0118501 A1 | 4/2015 | Lu |
| 2015/0159079 A1 | 6/2015 | Huh et al. |
| 2015/0268370 A1 | 9/2015 | Johnston et al. |
| 2015/0368547 A1 | 12/2015 | Lesko et al. |
| 2015/0376493 A1 | 12/2015 | Huh et al. |
| 2016/0040514 A1 | 2/2016 | Rahmani et al. |
| 2016/0083641 A1* | 3/2016 | Gamage ................ E21B 21/062 507/226 |
| 2016/0264846 A1* | 9/2016 | Bennetzen ............... E21B 43/20 |

FOREIGN PATENT DOCUMENTS

| | | |
|---|---|---|
| WO | 2012154332 | 11/2012 |
| WO | 2012158478 | 11/2012 |
| WO | 2013142869 | 9/2013 |
| WO | 2014066793 | 5/2014 |
| WO | 2015044446 | 4/2015 |

OTHER PUBLICATIONS

Bala et al., "Interaction of Different Metal Ions with Carboxylic Acid Group: A Quantitative Study," The Journal of Physical Chemistry A, vol. 111, No. 28, Jun. 2007; pp. 6183-6190.

Chen et al., "Aggregation Kinetics of Alginate-Coated Hematite Nanoparticles in Monovalent and Divalent Electrolytes," Environmental Science & Technology, vol. 40, No. 5, Mar. 2006, pp. 1516-1523.

Chen et al.; "Hydration Repulsion between Carbohydrate Surfaces Mediated by Temperature and Specific Ions," Scientific Reports, vol. 6, Jun. 23, 2016, pp. 1-10.

Cole et al.; "Polyethylene Glycol Modified, Cross-Linked Starch-Coated Iron Oxide Nanoparticles for Enhanced Magnetic tumor Targeting," Biomaterials, vol. 32, No. 8, Mar. 1, 2011, pp. 2183-2193.

Kramer, "Water-Soluble Dendritic Architectures with Carbohydrate Shells for the Templation and Stabilization of Catalytically Active Metal Nanoparticles," published by ACS, Macromolecules, vol. 38, No. 20, Aug. 27, 2005, pp. 8308-8315.

Martinez et al., "Polysaccharide-based Nanoparticles for Controlled Release Formulations," The Delivery of Nanoparticles, Published May 2012, pp. 185-222.

Saeki et al., "Upper and lower critical solution temperatures in poly (ethylene glycol) solutions," Polymer, vol. 17, No. 8, Aug. 1976; pp. 685-689.

ShamsiJazeyi et al., "Polymer-Coated Nanoparticles for Enhance Oil Recovery," Journal of Applied Polymer Science, vol. 131, No. 15, Aug. 5, 2014, 13 pages.

Zhao et al., "Chromatographic Separation of Highly Soluble Diamond Nanoparticles Prepared by Polyglycerol Grafting," Angewandte Chemie International Edition, vol. 50, No. 6, Feb. 7, 2011, pp. 1388-1392.

Communication Pursuant to Article 94(3) EPC issued in European Application No. 16741485.3 dated Dec. 18, 2018, 4 pages.

Communication Pursuant to Article 94(3) EPC issued in European Application No. 16741487.9 dated Jan. 22, 2019, 5 pages.

Invitation to Pay Additional Fees and Partial International Search Report issued in International Application No. PCT/US2016/041584 dated Oct. 7, 2016; 7 pages.

International Search Report and Written Opinion issued in International Application No. PCT/US2016/041604 dated Sep. 28, 2016; 17 pages.

International Search Report and Written Opinion issued in International Application No. PCT/US2016/041584 dated Dec. 22, 2016; 29 pages.

Gulf Cooperation Council Examination Report issued in GCC Application No. GC 2016-31702 dated Sep. 10, 2018, 4 pages.

Gulf Cooperation Council Examination Report issued in GCC Application No. GC 2016-31703 dated Sep. 10, 2018, 3 pages.

Gulf Cooperation Council Examination Report issued in GCC Application No. GC 2016-38077 dated Dec. 16, 2019, 4 pages.

Chinese Office Action issued in Chinese Application No. 201680052758.7 dated Feb. 6, 2020, 13 pages (English translation).

Gulf Cooperation Council Examination Report issued in GCC Application No. 2016-31703 dated Aug. 11, 2019, 3 pages.

Gulf Cooperation Council Examination Report issued in GCC Application No. 2016-31702 dated Aug. 12, 2019, 3 pages.

Communication Pursuant to Article 94(3) EPC issued in European Application No. 16741485.3 dated May 17, 2019, 5 pages.

Gulf Cooperation Council Examination Report issued in GCC Application No. GC 2016-31702 dated Mar. 10, 2019, 4 pages.

Gulf Cooperation Council Examination Report issued in GCC Application No. GC 2016-31703 dated Mar. 10, 2019, 4 pages.

Chinese Office Action issued in Chinese Application No. 201680052785.4 dated May 7, 2020, 6 pages.

\* cited by examiner

POLYSACCHARIDE COATED NANOPARTICLE COMPOSITIONS COMPRISING IONS

CROSS-REFERENCE TO RELATED APPLICATIONS

This application is a continuation of and claims the benefit of priority to U.S. patent application Ser. No. 15/035,033, filed Jul. 13, 2018, which is a divisional of U.S. patent application Ser. No. 15/205,774, filed Jul. 8, 2016, which claims the benefit of priority to U.S. Provisional Application Ser. No. 62/191,881, filed Jul. 13, 2015, the contents of which are hereby incorporated by reference.

TECHNICAL FIELD

This document relates to methods and compositions used in treating subterranean formations for enhancing hydrocarbon fluid recovery.

SUMMARY

Provided in this disclosure is a method of treating subterranean formations. The method includes placing in a subterranean formation a nanoparticle composition. The nanoparticle composition includes (i) a coated nanoparticle including a nanoparticle and a cross-linked carbohydrate-based coating and (ii) an ion selected from the group consisting of $Li^+$, $Na^+$, $K^+$, $Rb^+$, $Cs^+$, $Be^{2+}$, $Mg^{2+}$, $Ca^{2+}$, $Sr^{2+}$, $Ba^{2+}$, and mixtures thereof.

In some embodiments, the nanoparticle composition further includes an aqueous liquid. For example, the nanoparticle composition can include at least one of water, brine, produced water, flowback water, brackish water, fresh water, Arab-D-brine, sea water, mineral waters, and other waters of varying salinity and mineral concentration. The aqueous liquid can include at least one of a drilling fluid, a fracturing fluid, a diverting fluid, and a lost circulation treatment fluid.

In some embodiments, the method further includes obtaining or providing the composition. The obtaining or providing of the composition can occur above-surface. The obtaining or providing of the composition can occur in the subterranean formation.

In some embodiments, the nanoparticle is a silica nanoparticle, a rare earth upconverting nanoparticle, or a polymer nanoparticle. For example, the nanoparticle can be a polystyrene nanoparticle or a carbonaceous nanoparticle such as a carbon black nanoparticle, a carbon nanotube, a graphene nanoparticle, or graphene platelets.

In some embodiments, the nanoparticle is a metal oxide nanoparticle. For example, the metal oxide nanoparticle can be an iron oxide nanoparticle, a nickel oxide nanoparticle, or a cobalt oxide nanoparticle. The nanoparticle can include a metal oxide including Zn, Cr, Co, Dy, Er, Eu, Gd, Gd, Pr, Nd, In, Pr, Sm, Tb, Tm, and combinations thereof. In some embodiments, the nanoparticle is a superparamagnetic nanoparticle. In some embodiments, the nanoparticle includes a fluoride. For example, the nanoparticle can include upconverting rare earth nanoparticles such as doped $YF_4$ nanoparticles.

In some embodiments, the coated nanoparticle has particle size of about 10 nanometers ("nm") to about 1,000 nm.

In some embodiments, the cross-linked carbohydrate-based coating includes a carbohydrate including a monosaccharide, an oligosaccharide, a polysaccharide, and mixtures thereof. In some embodiments, the polysaccharide is selected from the group consisting of an alginate, a chitosan, a curdlan, a dextran, a derivatized dextran, an emulsan, a galactoglucopolysaccharide, a gellan, a glucuronan, an N-acetyl-glucosamine, an N-acetyl-heparosan, a hyaluronic acid, a kefiran, a lentinan, a levan, a mauran, a pullulan, a scleroglucan, a schizophyllan, a stewartan, a succinoglycan, a xanthan, a diutan, a welan, a starch, a derivatized starch, a tamarind, a tragacanth, a guar gum, a derivatized guar gum (for example, a hydroxypropyl guar, a carboxy methyl guar, or a carboxymethyl hydroxypropyl guar), a gum ghatti, a gum arabic, a locust bean gum, a cellulose, and a derivatized cellulose. For example, the polysaccharide can be a dextran.

In some embodiments, the polysaccharide has an average molecular weight of about 1,000 number average molecular weight ("MW") to about 150,000 MW. For example, the polysaccharide can be dextran with a number average molecular weight of about 1,000 MW to about 150,000 MW.

In some embodiments, the cross-linked carbohydrate-based coating is the reaction product of a cross-linking reaction between an epoxide-based compound and a carbohydrate. The epoxide-based compound can be selected from the group consisting of polyethylene glycol diglycidyl ether, epichlorohydrin, 1,4-butanediol diglycidyl ether, ethylene glycol diglycidyl ether, 1,6-hexanediol diglycidyl ether, propylene glycol diglycidyl ether, poly(propylene glycol)diglycidyl ether), poly(tetramethylene glycol)diglycidyl ether, neopentyl glycol diglycidyl ether, polyglycerol polyglycidyl ether, diglycerol polyglycidyl ether, glycerol polyglycidyl ether, trimethylpropane polyglycidyl ether, 1,2-(bis(2,3-epoxypropoxy)ethylene), pentaerythritol glycidyl ether, pentaerythritol polyglycidyl ether, sorbitol polyglycidyl ether, and mixtures thereof. In some embodiments, the epoxide-based compound is pentaerythritol glycidyl ether.

In some embodiments, the cross-linked carbohydrate-based coating is a reaction product of quenching reaction between the cross-linked carbohydrate-based coating and an amine-functionalized compound. The amine-functionalized compound can have the structure:

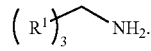

The variable $R^1$, at each occurrence, can be independently selected from —H, —OH, or a substituted or unsubstituted $(C_1-C_{10})$hyrdocarbyl. For example, the variable $R^1$ can be independently selected from —H, —OH, or —$(C_1-C_{10})$ alkyl-OH. In some embodiments, the amine-functionalized compound is 2-amino-2-hydroxymethyl-propane-1,3-diol.

In some embodiments, the method further includes aggregating and precipitating the coated nanoparticles in the subterranean formation by the addition of a kosmotropic ion. In some embodiments, the method is a method of fluid diversion and further includes aggregating, or aggregating and precipitating, the coated nanoparticles in the subterranean formation by the addition of a kosmotropic ion. In some embodiments, the method is a method of conformance control and further includes aggregating, or aggregating and precipitating of the coated nanoparticles in the subterranean formation by the addition of a kosmotropic ion.

In some embodiments, the method further includes aggregating the coated nanoparticles at an oil-water interface. For example, the coated nanoparticles can be aggregated at one or more oil-water interfaces by the addition of a chaotropic ion.

In some embodiments, the coated nanoparticle has a hydrodynamic diameter of about 10 nm to about 150 nm. For example, the coated nanoparticle can have a hydrodynamic diameter of about 20 nm to about 60 nm. In some embodiments, the coated nanoparticles of the composition have a hydrodynamic diameter of less than about 100 nm after heating at 90° C. in seawater for 7 days.

The coated nanoparticles of the composition can have a hydrodynamic diameter that is less than the hydrodynamic diameter of similar coated nanoparticles in a similar composition without the ion.

In some embodiments, the coated nanoparticles of the composition have a lower critical solution temperature of greater than about 90° C.

In some embodiments, the coated nanoparticles of the composition have a higher permeability as compared to similar coated nanoparticles in a similar composition without the ion.

In some embodiments, the method further includes combining the composition with an aqueous or oil-based fluid including a drilling fluid, a stimulation fluid, a fracturing fluid, a spotting fluid, a clean-up fluid, a completion fluid, a remedial treatment fluid, an abandonment fluid, a pill, an acidizing fluid, a cementing fluid, a packer fluid, a logging fluid, or a combination thereof, to form a mixture, in which the placing the composition in the subterranean formation includes placing the mixture in the subterranean formation.

In some embodiments, at least one of prior to, during, and after the placing of the composition in the subterranean formation, the composition is used in the subterranean formation, at least one of alone and in combination with other materials, as a drilling fluid, stimulation fluid, fracturing fluid, spotting fluid, clean-up fluid, completion fluid, remedial treatment fluid, abandonment fluid, pill, acidizing fluid, cementing fluid, packer fluid, logging fluid, or a combination thereof.

In some embodiments, the composition further includes a saline, a salt, an aqueous base, an oil (e.g., a synthetic fluid oil phase), an organic solvent, an aqueous solution, an alcohol or polyol (e.g., cellulose or starch), an alkalinity control agent, an acidity control agent, a density control agent, a density modifier, an emulsifier, a dispersant, a polymeric stabilizer, a crosslinking agent, a polyacrylamide, a polymer, an antioxidant, a heat stabilizer, a foam control agent, a diluent, a plasticizer, a filler or inorganic particle, a pigment, a dye, a precipitating agent, a rheology modifier, a oil-wetting agent, a weight reducing additive, a heavy-weight additive, a set retarding additive, a surfactant, a corrosion inhibitor, a gas, a lost circulation material, a filtration control additive, a fiber, a thixotropic additive, a breaker, a curing accelerator, a curing retarder, a pH modifier, a chelating agent, a scale inhibitor, an enzyme, a resin, a water control material, an oxidizer, a marker, a Portland cement, a pozzolana cement, a gypsum cement, a high alumina content cement, a slag cement, a silica cement, a fly ash, a metakaolin, a shale, a zeolite, a crystalline silica compound, an amorphous silica, fibers, a hydratable clay, a microsphere, a pozzolan lime, or a combination thereof.

In some embodiments, the composition further includes a proppant, a resin-coated proppant, or a combination thereof.

In some embodiments, the method further includes processing the composition exiting the annulus with at least one fluid processing unit to generate a cleaned composition and recirculating the cleaned composition through the wellbore.

Also provided in this disclosure, is a method of treating a subterranean formation, the method including placing in a subterranean formation a nanoparticle composition including (i) a coated nanoparticle including (a) an iron oxide nanoparticle and (b) a cross-linked carbohydrate-based coating including dextran, pentaerythritol glycidyl ether, and 2-amino-2-hydroxymethyl-propane-1,3-diol; and (ii) an ion including $Ca^{2+}$, in which the dextran is cross-linked by pentaerythritol glycidyl ether.

Also provided in this disclosure, is a system including a nanoparticle composition including (i) a coated nanoparticle including a nanoparticle and a cross-linked carbohydrate-based coating, and (ii) an ion selected from the group consisting of $Li^+$, $Na^+$, $K^+$, $Rb^+$, $Cs^+$, $Be^{2+}$, $Mg^{2+}$, $Ca^{2+}$, $Sr^{2+}$, $Ba^{2+}$, and mixtures thereof; and (iii) a subterranean formation including the composition therein.

Also provided in this disclosure, is a nanoparticle composition for treatment of a subterranean formation, the nanoparticle composition including (i) a coated nanoparticle including a nanoparticle and a cross-linked carbohydrate-based coating, and (ii) an ion selected from the group consisting of $Li^+$, $Na^+$, $K^+$, $Rb^+$, $Cs^+$, $Be^{2+}$, $Mg^{2+}$, $Ca^{2+}$, $Sr^{2+}$, $Ba^{2+}$, and mixtures thereof. The composition can further include a downhole fluid.

Also provided in this disclosure, is a composition for treatment of a subterranean formation, the composition including (i) a coated nanoparticle including an iron oxide nanoparticle and a cross-linked carbohydrate-based coating including dextran, pentaerythritol glycidyl ether, and 2-amino-2-hydroxymethyl-propane-1,3-diol in which the dextran is cross-linked by pentaerythritol glycidyl ether and (ii) an ion including $Ca^{2+}$.

Various embodiments of the methods and compositions provided in this disclosure provide certain advantages over other methods and compositions, at least some of which are unexpected. For example, the methods and compositions provided in this disclosure provide a strategy to stabilizing nanomaterials in high saline, high temperature subterranean formations.

For example, an unexpected synergism between polysaccharide coatings and calcium ions has been discovered, which facilitates their use in oil reservoirs (for example, Saudi Arabian oil reservoirs). Further, the standard seawater used as injection fluid in oil reservoirs (for example, Saudi Arabian oil reservoirs) is not conducive to the use of polysaccharide coated nanomaterials. It has been unexpectedly discovered that the use of polysaccharide coated nanomaterials is possible through addition of ions (for example, calcium ions) to the seawater fluid. In some embodiments, methods and compositions provided in this disclosure utilize inexpensive, readily available and environmentally friendly components.

In some embodiments, the methods and compositions provided in this disclosure can be used to identify oil rich regions via imaging techniques or to lower the interfacial tension between oil and water for enhanced oil recovery ("EOR") applications.

In some embodiments, the methods and compositions provided in this disclosure can be used to selectively precipitate the nanomaterials in subterranean formations for fluid diversion or conformance control operations.

DETAILED DESCRIPTION

Figure 1:
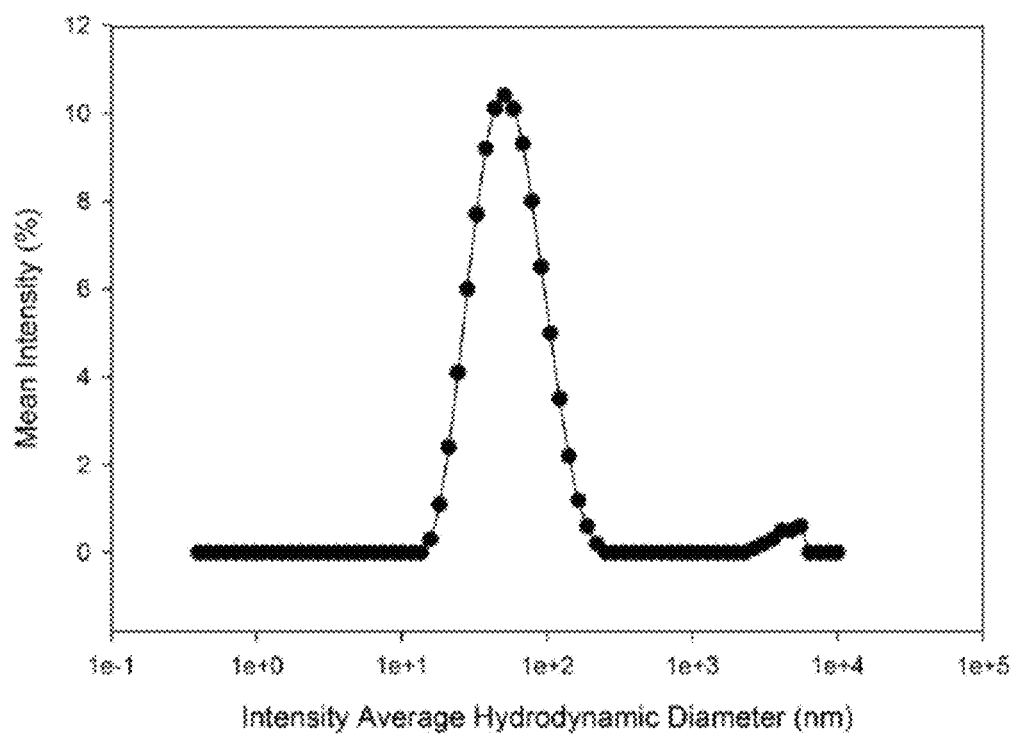
FIG. 1 shows dynamic light scattering determination of dextran coated nanoparticle hydrodynamic diameter, as provided in this disclosure.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (for example, 1%, 2%, 3%, and 4%) and the sub-ranges (for example, 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

All publications, patents, and patent documents referred to in this document are incorporated by reference in this disclosure in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods of manufacturing described in this disclosure, the acts can be carried out in any order, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used in this disclosure can allow for a degree of variability in a value or range, for example, within 10%, within 5%, or within 1% of a stated value or of a stated limit of a range.

The term "substantially" as used in this disclosure refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "organic group" as used in this disclosure refers to but is not limited to any carbon-containing functional group. For example, an oxygen-containing group such as an alkoxy group, aryloxy group, aralkyloxy group, oxo(carbonyl) group, a carboxyl group including a carboxylic acid, carboxylate, and a carboxylate ester; a sulfur-containing group such as an alkyl and aryl sulfide group; and other heteroatom-containing groups. Non-limiting examples of organic groups include OR, OOR, OC(O)N(R)$_2$, CN, CF$_3$, OCF$_3$, R, C(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, or C(=NOR)R, in which R can be hydrogen (in examples that include other carbon atoms) or a carbon-based moiety, and in which the carbon-based moiety can itself be further substituted.

The term "substituted" as used in this disclosure refers to an organic group as defined in this disclosure or molecule in which one or more hydrogen atoms contained therein are replaced by one or more non-hydrogen atoms. The term "functional group" or "substituent" as used in this disclosure refers to a group that can be or is substituted onto a molecule or onto an organic group. Examples of substituents or functional groups include, but are not limited to, a halogen (for example, F, Cl, Br, and I); an oxygen atom in groups such as hydroxy groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxyamines, nitriles, nitro groups, N-oxides, hydrazides, azides, and enamines; and other heteroatoms in various other groups.

The term "alkyl" as used in this disclosure refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used in this disclosure, the term "alkyl" encompasses n-alkyl, isoalkyl, and anteisoalkyl groups as well as other branched chain forms of alkyl. Representative substituted alkyl groups can be substituted one or more times with any of the groups listed in this disclosure, for example, amino, hydroxy, cyano, carboxy, nitro, thio, alkoxy, and halogen groups.

The term "alkenyl" as used in this disclosure refers to straight and branched chain and cyclic alkyl groups as defined in this disclosure, except that at least one double bond exists between two carbon atoms. Thus, alkenyl groups have from 2 to 40 carbon atoms, or 2 to about 20 carbon atoms, or 2 to 12 carbons or, in some embodiments, from 2 to 8 carbon atoms. Examples include, but are not limited to vinyl, —CH=CH(CH$_3$), —CH=C(CH$_3$)$_2$, —C(CH$_3$)=CH$_2$, —C(CH$_3$)=CH(CH$_3$), —C(CH$_2$CH$_3$)=CH$_2$, cyclohexenyl, cyclopentenyl, cyclohexadienyl, butadienyl, pentadienyl, and hexadienyl among others.

The term "alkynyl" as used in this disclosure refers to straight and branched chain alkyl groups, except that at least one triple bond exists between two carbon atoms. Thus, alkynyl groups have from 2 to 40 carbon atoms, 2 to about 20 carbon atoms, or from 2 to 12 carbons or, in some embodiments, from 2 to 8 carbon atoms. Examples include, but are not limited to —C≡CH, —C≡C(CH$_3$), —C≡C(CH$_2$CH$_3$), —CH$_2$C≡CH, —CH$_2$C≡C(CH$_3$), and —CH$_2$C≡C(CH$_2$CH$_3$) among others.

The term "acyl" as used in this disclosure refers to a group containing a carbonyl moiety in which the group is bonded via the carbonyl carbon atom. The carbonyl carbon atom is also bonded to another carbon atom, which can be part of an alkyl, aryl, aralkyl cycloalkyl, cycloalkylalkyl, heterocyclyl, heterocyclylalkyl, heteroaryl, heteroarylalkyl group or the like. In the special case in which the carbonyl carbon atom is bonded to a hydrogen, the group is a "formyl" group, an acyl group as the term is defined in this disclosure. An acyl group can include 0 to about 12-20 or 12-40 additional carbon atoms bonded to the carbonyl group. An acyl group can include double or triple bonds within the meaning in this disclosure. An acryloyl group is an example of an acyl group. An acyl group can also include heteroatoms within the meaning here. A nicotinoyl group (pyridyl-3-carbonyl) is an example of an acyl group within the meaning in this disclosure. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group.

The term "cycloalkyl" as used in this disclosure refers to cyclic alkyl groups such as, but not limited to, cyclopropyl, cyclobutyl, cyclopentyl, cyclohexyl, cycloheptyl, and cyclooctyl groups. In some embodiments, the cycloalkyl group can have 3 to about 8-12 ring members, whereas in other embodiments the number of ring carbon atoms range from 3 to 4, 5, 6, or 7. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined in this disclosure. Representative substituted cycloalkyl groups can be mono-substituted or substituted more than once, such as, but not limited to, 2,2-, 2,3-, 2,4-2,5- or 2,6-disubstituted cyclohexyl groups or mono-, di- or tri-substituted norbornyl or cycloheptyl groups, which can be substituted with, for example, amino, hydroxy, cyano, carboxy, nitro, thio, alkoxy, and halogen groups. The term "cycloalkenyl" alone or in combination denotes a cyclic alkenyl group.

The term "aryl" as used in this disclosure refers to cyclic aromatic hydrocarbons that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined in this disclosure. Representative substituted aryl groups can be mono-substituted or substituted more than once, such as, but not limited to, 2-, 3-, 4-, 5-, or 6-substituted phenyl or 2-8 substituted naphthyl groups, which can be substituted with carbon or non-carbon groups such as those listed in this disclosure.

The term "aralkyl" as used in this disclosure refers to alkyl groups as defined in this disclosure in which a hydrogen or carbon bond of an alkyl group is replaced with a bond to an aryl group as defined in this disclosure. Representative aralkyl groups include benzyl and phenylethyl groups and fused (cycloalkylaryl)alkyl groups such as 4-ethyl-indanyl. Aralkenyl groups are alkenyl groups as defined in this disclosure in which a hydrogen or carbon bond of an alkyl group is replaced with a bond to an aryl group as defined in this disclosure.

The term "heterocyclyl" as used in this disclosure refers to aromatic and non-aromatic ring compounds containing three or more ring members, of which one or more is a heteroatom such as, but not limited to, N, O, and S. Thus, a heterocyclyl can be a cycloheteroalkyl, or a heteroaryl, or if polycyclic, any combination thereof. In some embodiments, heterocyclyl groups include 3 to about 20 ring members, whereas other such groups have 3 to about 15 ring members. A heterocyclyl group designated as a C$_2$-heterocyclyl can be a 5-ring with two carbon atoms and three heteroatoms, a 6-ring with two carbon atoms and four heteroatoms and so forth. Likewise a C$_4$-heterocyclyl can be a 5-ring with one heteroatom, a 6-ring with two heteroatoms, and so forth. The number of carbon atoms plus the number of heteroatoms equals the total number of ring atoms. A heterocyclyl ring can also include one or more double bonds. A heteroaryl ring is an embodiment of a heterocyclyl group. The phrase "heterocyclyl group" includes fused ring species including those that include fused aromatic and non-aromatic groups.

The term "heterocyclylalkyl" as used in this disclosure refers to alkyl groups as defined in this disclosure in which a hydrogen or carbon bond of an alkyl group as defined in this disclosure is replaced with a bond to a heterocyclyl group as defined in this disclosure. Representative heterocyclyl alkyl groups include, but are not limited to, furan-2-yl methyl, furan-3-yl methyl, pyridine-3-yl methyl, tetrahydrofuran-2-yl ethyl, and indol-2-yl propyl.

The term "heteroarylalkyl" as used in this disclosure refers to alkyl groups as defined in this disclosure in which a hydrogen or carbon bond of an alkyl group is replaced with a bond to a heteroaryl group as defined in this disclosure.

The term "alkoxy" as used in this disclosure refers to an oxygen atom connected to an alkyl group, including a cycloalkyl group, as are defined in this disclosure. Examples of linear alkoxy groups include but are not limited to methoxy, ethoxy, propoxy, butoxy, pentyloxy, hexyloxy, and the like. Examples of branched alkoxy include but are not limited to isopropoxy, sec-butoxy, tert-butoxy, isopentyloxy, isohexyloxy, and the like. Examples of cyclic alkoxy include but are not limited to cyclopropyloxy, cyclobutyloxy, cyclopentyloxy, cyclohexyloxy, and the like. An alkoxy group can include one to about 12-20 or about 12-40 carbon atoms bonded to the oxygen atom, and can further include double or triple bonds, and can also include heteroatoms. For example, an allyloxy group is an alkoxy group within the meaning in this disclosure. A methoxyethoxy group is also an alkoxy group within the meaning in this disclosure, as is a methylenedioxy group in a context where two adjacent atoms of a structure are substituted therewith.

The term "amine" as used in this disclosure refers to primary, secondary, and tertiary amines having, for example, the formula $N(group)_3$ in which each group can independently be H or non-H, such as alkyl, aryl, and the like. Amines include but are not limited to $R-NH_2$, for example, alkylamines, arylamines, alkylarylamines; $R_2NH$ in which each R is independently selected, such as dialkylamines, diarylamines, aralkylamines, heterocyclylamines and the like; and $R_3N$ in which each R is independently selected, such as trialkylamines, dialkylarylamines, alkyldiarylamines, triarylamines, and the like. The term "amine" also includes ammonium ions as used in this disclosure.

The term "amino group" as used in this disclosure refers to a substituent of the form $-NH_2$, $-NHR$, $-NR_2$, $-NR_3^+$, in which each R is independently selected, and protonated forms of each, except for $-NR_3^+$, which cannot be protonated. Accordingly, any compound substituted with an amino group can be viewed as an amine. An "amino group" within the meaning in this disclosure can be a primary, secondary, tertiary, or quaternary amino group. An "alkylamino" group includes a monoalkylamino, dialkylamino, and trialkylamino group.

The terms "halo," "halogen," or "halide" group, as used in this disclosure, by themselves or as part of another substituent, mean, unless otherwise stated, a fluorine, chlorine, bromine, or iodine atom.

The term "haloalkyl" group, as used in this disclosure, includes mono-halo alkyl groups, poly-halo alkyl groups in which all halo atoms can be the same or different, and per-halo alkyl groups, in which all hydrogen atoms are replaced by halogen atoms, such as fluoro. Examples of haloalkyl include trifluoromethyl, 1,1-dichloroethyl, 1,2-dichloroethyl, 1,3-dibromo-3,3-difluoropropyl, perfluorobutyl, and the like.

The term "hydrocarbon" as used in this disclosure refers to a functional group or molecule that includes carbon and hydrogen atoms. The term can also refer to a functional group or molecule that normally includes both carbon and hydrogen atoms but in which all the hydrogen atoms are substituted with other functional groups.

As used in this disclosure, the term "hydrocarbyl" refers to a functional group derived from a straight chain, branched, or cyclic hydrocarbon, and can be alkyl, alkenyl, alkynyl, aryl, cycloalkyl, acyl, or any combination thereof.

The term "solvent" as used in this disclosure refers to a liquid that can dissolve a solid, another liquid, or a gas to form a solution. Non-limiting examples of solvents are silicones, organic compounds, water, alcohols, ionic liquids, and supercritical fluids.

The term "room temperature" as used in this disclosure refers to a temperature of about 15° C. to about 28° C.

The term "standard temperature and pressure" as used in this disclosure refers to 20° C. and 101 kPa.

The term "downhole" as used in this disclosure refers to under the surface of the earth, such as a location within or fluidly connected to a wellbore.

As used in this disclosure, the term "drilling fluid" refers to fluids, slurries, or muds used in drilling operations downhole, such as during the formation of the wellbore.

As used in this disclosure, the term "stimulation fluid" refers to fluids or slurries used downhole during stimulation activities of the well that can increase the production of a well, including perforation activities. In some examples, a stimulation fluid can include a fracturing fluid or an acidizing fluid.

As used in this disclosure, the term "clean-up fluid" refers to fluids or slurries used downhole during clean-up activities of the well, such as any treatment to remove material obstructing the flow of desired material from the subterranean formation. In one example, a clean-up fluid can be an acidification treatment to remove material formed by one or more perforation treatments. In another example, a clean-up fluid can be used to remove a filter cake.

As used in this disclosure, the term "fracturing fluid" refers to fluids or slurries used downhole during fracturing operations.

As used in this disclosure, the term "spotting fluid" refers to fluids or slurries used downhole during spotting operations, and can be any fluid designed for localized treatment of a downhole region. In one example, a spotting fluid can include a lost circulation material for treatment of a specific section of the wellbore, such as to seal off fractures in the wellbore and prevent sag. In another example, a spotting fluid can include a water control material. In some examples, a spotting fluid can be designed to free a stuck piece of drilling or extraction equipment, can reduce torque and drag with drilling lubricants, prevent differential sticking, promote wellbore stability, and can help to control mud weight.

As used in this disclosure, the term "completion fluid" refers to fluids or slurries used downhole during the completion phase of a well, including cementing compositions.

As used in this disclosure, the term "remedial treatment fluid" refers to fluids or slurries used downhole for remedial treatment of a well. Remedial treatments can include treatments designed to increase or maintain the production rate of a well, such as stimulation or clean-up treatments.

As used in this disclosure, the term "abandonment fluid" refers to fluids or slurries used downhole during or preceding the abandonment phase of a well.

As used in this disclosure, the term "acidizing fluid" refers to fluids or slurries used downhole during acidizing treatments. In one example, an acidizing fluid is used in a clean-up operation to remove material obstructing the flow of desired material, such as material formed during a perforation operation. In some examples, an acidizing fluid can be used for damage removal.

As used in this disclosure, the term "cementing fluid" refers to fluids or slurries used during cementing operations of a well. For example, a cementing fluid can include an aqueous mixture including at least one of cement and cement kiln dust. In another example, a cementing fluid can include a curable resinous material such as a polymer that is in an at least partially uncured state.

As used in this disclosure, the term "water control material" refers to a solid or liquid material that interacts with aqueous material downhole, such that hydrophobic material can more easily travel to the surface and such that hydrophilic material (including water) can less easily travel to the surface. A water control material can be used to treat a well to cause the proportion of water produced to decrease and to cause the proportion of hydrocarbons produced to increase, such as by selectively binding together material between water-producing subterranean formations and the wellbore while still allowing hydrocarbon-producing formations to maintain output.

As used in this disclosure, the term "packer fluid" refers to fluids or slurries that can be placed in the annular region of a well between tubing and outer casing above a packer. In various examples, the packer fluid can provide hydrostatic pressure in order to lower differential pressure across the sealing element, lower differential pressure on the wellbore and casing to prevent collapse, and protect metals and elastomers from corrosion.

As used in this disclosure, the term "fluid" refers to liquids and gels, unless otherwise indicated.

As used in this disclosure, the term "subterranean material" or "subterranean formation" refers to any material under the surface of the earth, including under the surface of the bottom of the ocean. For example, a subterranean formation or material can be any section of a wellbore and any section of a subterranean petroleum- or water-producing formation or region in fluid contact with the wellbore. Placing a material in a subterranean formation can include contacting the material with any section of a wellbore or with any subterranean region in fluid contact therewith. Subterranean materials can include any materials placed into the wellbore such as cement, drill shafts, liners, tubing, casing, or screens; placing a material in a subterranean formation can include contacting with such subterranean materials. In some examples, a subterranean formation or material can be any below-ground region that can produce liquid or gaseous petroleum materials, water, or any section below-ground in fluid contact therewith. For example, a subterranean formation or material can be at least one of an area desired to be fractured, a fracture or an area surrounding a fracture, and a flow pathway or an area surrounding a flow pathway, in which a fracture or a flow pathway can be optionally fluidly connected to a subterranean petroleum- or water-producing region, directly or through one or more fractures or flow pathways.

As used in this disclosure, "treatment of a subterranean formation" can include any activity directed to extraction of water or petroleum materials from a subterranean petroleum- or water-producing formation or region, for example, including drilling, stimulation, hydraulic fracturing, clean-up, acidizing, completion, cementing, remedial treatment, abandonment, aquifer remediation, identifying oil rich regions via imaging techniques, and the like.

As used in this disclosure, a "flow pathway" downhole can include any suitable subterranean flow pathway through which two subterranean locations are in fluid connection. The flow pathway can be sufficient for petroleum or water to flow from one subterranean location to the wellbore or vice-versa. A flow pathway can include at least one of a hydraulic fracture, and a fluid connection across a screen, across gravel pack, across proppant, including across resin-bonded proppant or proppant deposited in a fracture, and across sand. A flow pathway can include a natural subterranean passageway through which fluids can flow. In some embodiments, a flow pathway can be a water source and can include water. In some embodiments, a flow pathway can be a petroleum source and can include petroleum. In some embodiments, a flow pathway can be sufficient to divert from a wellbore, fracture, or flow pathway connected thereto at least one of water, a downhole fluid, or a produced hydrocarbon.

As used in this disclosure, a "carrier fluid" refers to any suitable fluid for suspending, dissolving, mixing, or emulsifying with one or more materials to form a composition. For example, the carrier fluid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a $C_2$-$C_{40}$ fatty acid $C_1$-$C_{10}$ alkyl ester (for example, a fatty acid methyl ester), tetrahydrofurfuryl methacrylate, tetrahydrofurfuryl acrylate, 2-butoxy ethanol, butyl acetate, butyl lactate, furfuryl acetate, dimethyl sulfoxide, dimethyl formamide, a petroleum distillation product of fraction (for example, diesel, kerosene, napthas, and the like) mineral oil, a hydrocarbon oil, a hydrocarbon including an aromatic carbon-carbon bond (for example, benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (for example, cyclohexanone, hexane), water, brine, produced water, flowback water, brackish water, and sea water. The fluid can form about 0.001 weight percent (wt %) to about 99.999 wt % of a composition, or a mixture including the same, or about 0.001 wt % or less, 0.01 wt %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt % or more.

Method of Treating a Subterranean Formation

Provided in this disclosure is a method of treating subterranean formations. The method includes placing in a subterranean formation a nanoparticle composition. The nanoparticle composition includes (i) a coated nanoparticle including a nanoparticle and a cross-linked carbohydrate-based coating and (ii) an ion selected from the group consisting of $Li^+$, $Na^+$, $K^+$, $Rb^+$, $Be^{2+}$, $Mg^{2+}$, $Ca^{2+}$, $Sr^{2+}$, $Ba^{2+}$, and mixtures thereof.

In some embodiments, the nanoparticle composition further includes an aqueous liquid. For example, the nanoparticle composition can include at least one of water, brine, produced water, flowback water, brackish water, Arab-D-brine, and sea water. In some embodiments, the at least one type of water can serve as the source for some or all of the ions selected from the group consisting of $Li^+$, $Na^+$, $K^+$, $Rb^+$, $Cs^+$, $Be^{2+}$, $Mg^{2+}$, $Ca^{2+}$, $Sr^{2+}$, $Ba^{2+}$, and mixtures thereof. The aqueous liquid can include at least one of a drilling fluid, a fracturing fluid, a diverting fluid, an injection fluid, and a lost circulation treatment fluid.

In some embodiments, the method further includes obtaining or providing the composition, in which the obtaining or providing of the composition occurs above-surface. In some embodiments, the method further includes obtaining or providing the composition, in which the obtaining or providing of the composition occurs in the subterranean formation.

The nanoparticle can be a metal oxide nanoparticle. For example, the metal oxide nanoparticle can be an iron oxide nanoparticle, a nickel oxide nanoparticle, or a cobalt oxide nanoparticle. The nanoparticle can include a metal oxide including Zn, Cr, Co, Dy, Er, Eu, Gd, Gd, Pr, Nd, In, Pr, Sm, Tb, Tm, and combinations thereof. In some embodiments, the nanoparticle is a superparamagnetic nanoparticle. As used in this disclosure, the term "superparamagnetic nanoparticle" refers to a nanoparticle that exhibits strong paramagnetic behavior in the presence of an applied magnetic field. In some embodiments, the superparamagnetic nanoparticles can include iron oxides, such as $Fe_3O_4$ and $\gamma\text{-}Fe_2O_3$, pure metals, such as Fe and Co, spinel-type ferromagnets, such as $MgFe_2O_4$, $MnFe_2O_4$, and $CoFe_2O_4$, as well as alloys, such as $CoPt_3$ and FePt. For example, the nanoparticles can include superparamagnetic iron oxide cores. Nanoparticles including a superparamagnetic core (e.g., superparamagnetic nanoparticles) can exhibits strong paramagnetic behavior in the presence of an applied magnetic field. In the absence of an applied field, superparamagnetic nanoparticles can exhibit no magnetic moment. This is due to the nanometer length scale of the magnetic domains in the superparamagnetic nanoparticle. In some embodiments, these superparamagnetic nanoparticles can be used as contrast agents for electromagnetic crosswell imaging. The change in magnetic susceptibility of the composition including superparamagnetic nanoparticles provides contrast against native fluids. Consequently, the compositions described in this disclosure provide for an increase in magnetic susceptibility without a loss in colloidal stability.

In some embodiments, the nanoparticle can be a polystyrene nanoparticle or a carbonaceous nanoparticle such as a carbon black nanoparticle, a carbon nanotube, a graphene nanoparticle, graphene platelets or any other suitable nanomaterial.

In some embodiments, the nanoparticles have a particle size of about 10 nm to about 1,000 nm. For example, the nanoparticle can have a particle size of about 10 nm to about 100 nm, about 20 nm to about 80 nm, or less than about 100 nm. In some embodiments, the nanoparticles in the composition can have an average size of about 10 nm to about 1,000 nm. For example, the nanoparticle can have an average size of about 10 nm to about 100 nm, about 20 nm to about 80 nm, or less than about 100 nm. As used in this disclosure, the term "average size" refers to the arithmetic mean of the distribution of nanoparticle sizes in a plurality of nanoparticles. The nanoparticle size can be determined by dynamic light scattering prior to forming the coated nanoparticle or by scanning electron microscopy after the formation of the coated nanoparticle.

The cross-linked carbohydrate-based coating can include a carbohydrate including a monosaccharide, an oligosaccharide, a polysaccharide, and mixtures thereof. In some embodiments, the polysaccharide is selected from the group consisting of an alginate, a chitosan, a curdlan, a dextran, a derivatized dextran, an emulsan, a galactoglucopolysaccharide, a gellan, a glucuronan, an N-acetyl-glucosamine, an N-acetyl-heparosan, a hyaluronic acid, a kefiran, a lentinan, a levan, a mauran, a pullulan, a scleroglucan, a schizophyllan, a stewartan, a succinoglycan, a xanthan, a diutan, a welan, a starch, a derivatized starch, a tamarind, a tragacanth, a guar gum, a derivatized guar gum (for example, a hydroxypropyl guar, a carboxy methyl guar, or a carboxymethyl hydroxypropyl guar), a gum ghatti, a gum arabic, a locust bean gum, a cellulose, and a derivatized cellulose (for example, a carboxymethyl cellulose, a hydroxyethyl cellulose, a carboxymethyl hydroxyethyl cellulose, a hydroxypropyl cellulose, or a methyl hydroxy ethyl cellulose). In some embodiments, the polysaccharide can be dextran.

The polysaccharide can have a number average molecular weight of about 1,000 MW to about 150,000 MW. For example, the polysaccharide can have a number average molecular weight of about 10,000 MW to about 140,000 MW, about 30,000 MW to about 130,000 MW, 50,000 MW to about 120,000 MW, 70,000 MW to about 110,000 MW, or about 80,000 MW to about 100,000 MW or about 1,000 MW, 5,000 MW, 10,000 MW, 20,000 MW, 30,000 MW, 40,000 MW, 50,000 MW, 60,000 MW, 70,000 MW, 80,000 MW, 90,000 MW, 100,000 MW, 110,000 MW, 120,000 MW, 130,000 MW, 140,000 MW, or about 150,000 MW or greater.

The polysaccharide can be dextran with a number average molecular weight of about 1,000 MW to about 150,000 MW. For example, the dextran can have a number average molecular weight of about 10,000 MW to about 140,000 MW, about 30,000 MW to about 130,000 MW, 50,000 MW to about 120,000 MW, 70,000 MW to about 110,000 MW, or about 80,000 MW to about 100,000 MW or about 1,000 MW, 5,000 MW, 10,000 MW, 20,000 MW, 30,000 MW, 40,000 MW, 50,000 MW, 60,000 MW, 70,000 MW, 80,000 MW, 90,000 MW, 100,000 MW, 110,000 MW, 120,000 MW, 130,000 MW, 140,000 MW, or about 150,000 MW or greater.

In some embodiments, the cross-linked carbohydrate-based coating is the reaction product of a cross-linking reaction between an epoxide-based compound and a carbohydrate. Cross-linking the carbohydrate-based coating can ensure that the carbohydrate based coating remains associated with the underlying nanoparticle. The epoxide-based compound can be selected from the group consisting of polyethylene glycol diglycidyl ether, epichlorohydrin, 1,4-butanediol diglycidyl ether, ethylene glycol diglycidyl ether, 1,6-hexanediol diglycidyl ether, propylene glycol diglycidyl ether, poly(propylene glycol)diglycidyl ether), poly(tetramethylene glycol)diglycidyl ether, neopentyl glycol diglycidyl ether, polyglycerol polyglycidyl ether, diglycerol polyglycidyl ether, glycerol polyglycidyl ether, trimethylpropane polyglycidyl ether, 1,2-(bis(2,3-epoxypropoxy)ethylene), pentaerythritol glycidyl ether, pentaerythritol polyglycidyl ether, sorbitol polyglycidyl ether, and mixtures thereof. In some embodiments, the epoxide-based compound is pentaerythritol glycidyl ether.

The cross-linked carbohydrate-based coating can be the reaction product of a quenching reaction between the cross-linked carbohydrate-based coating and an amine-functionalized compound. Quenching the cross-linked, carbohydrate based coating can involve reacting an amine with unreacted epoxides present in the cross-linked, carbohydrate-based coating. Additionally, quenching the unreacted epoxides can serve to prevent undesired cross-linking between nanoparticles. The amine-functionalized compound can have the structure:

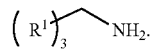

The variable $R^1$, at each occurrence, can be independently selected from —H, —OH, or a substituted or unsubstituted $(C_1\text{-}C_{10})$hyrdocarbyl. For example, the variable $R^1$ can be independently selected from —H, —OH, or —$(C_1\text{-}C_{10})$ alkyl-OH. In some embodiments, the amine-functionalized compound is 2-amino-2-hydroxymethyl-propane-1,3-diol.

In some embodiments, the composition further includes a counterion. For example, the counterion can be a halide, such as fluoride, chloride, iodide, or bromide. In other examples, the counterion can be nitrate, hydrogen sulfate, dihydrogen phosphate, bicarbonate, nitrite, perchlorate, iodate, chlorate, bromate, chlorite, hypochlorite, hypobromite, cyanide, amide, cyanate, hydroxide, permanganate. The counterion can be a conjugate base of any carboxylic acid, such as acetate or formate.

In some embodiments, the method further includes aggregating and precipitating the coated nanoparticles in the subterranean formation by the addition of an additional ion, such as a kosmotropic ion (e.g., magnesium). In some embodiments, the method is a method of fluid diversion and further includes aggregating, or aggregating and precipitating, the coated nanoparticles in the subterranean formation by the addition of a kosmotropic ion. In some embodiments, the method is a method of conformance control and further includes aggregating, or aggregating and precipitating, of the coated nanoparticles in the subterranean formation by the addition of a kosmotropic ion. For example, after the composition has been placed in the subterranean formation a kosmotropic ion may be added to the composition. Addition of the kosmotropic ion can lead to aggregation, or aggregation and precipitation, of the coated nanoparticles in the subterranean formation. Such, compositions including kosmotropic ions are useful in fluid diversion or conformance control.

As used in this disclosure, the term "kosmotropic ion" refers to ions that contribute to the stability and structure of water-water interactions. Kosmotropes typically cause water molecules to favorably interact, which also stabilizes intermolecular interactions in macromolecules. Examples of ionic kosmotropic ions include sulfate, phosphate, $Mg^{2+}$, $Li^+$, and any other suitable substance. Based on free energy of hydration ($\Delta G_{hydr}$) of the salts, an increasing negative $\Delta G_{hydr}$, results in a more kosmotropic salt, for example. Other suitable kosmotropes may include a sulfate, phosphate, hydrogenphosphate salt, ammonium sulfate, sodium sulfate, citrates, oxalates, and any other order increasing substance. The counterion may include Group IA metal ions, Group IIA metal ions, ammonium ions, and other suitable ions.

In some embodiments, the method further includes aggregating the coated nanoparticles at an oil-water interface. For example, the coated nanoparticles can be aggregated at one or more oil-water interfaces by the addition of a chaotropic ion.

As used in this disclosure, the term "chaotripoc ion" refers to ions that disrupt the three dimensional structure of water. Chaotropes typically interfere with stabilizing intra-molecular interactions mediated by non-covalent forces, such as hydrogen bonds, Van der Waals forces, and hydrophobic effects. Examples of chaotropes include urea, guanidinium chloride, and lithium perchlorate.

The coated nanoparticles of the composition can have a hydrodynamic diameter of about 10 nm to about 150 nm. For example, the coated nanoparticles of the composition can have a hydrodynamic diameter of about 20 nm to about 60 nm, 20 nm to about 80 nm, or about 20 nm to about 120 nm. In some embodiments, the coated nanoparticles of the composition can have a hydrodynamic diameter of less than about 100 nm after heating at 90° C. in seawater (e.g., synthetic seawater) for 7 days. For example, the coated nanoparticles of the composition can have a hydrodynamic diameter of less than about 100 nm after heating at 90° C. in seawater for 7 days when they are at a concentration of about 100 parts per million (ppm, as used herein 1 ppm is equal to 1 mg/L) to about 2,000 ppm. In some embodiment, the coated nanoparticles of the composition can have a hydrodynamic diameter of less than about 90 nm, less than about 80 nm, less than about 70 nm, or less than about 60 nm after heating at 90° C. in seawater for 7 days. For example, coated nanoparticles of the composition can have a hydrodynamic diameter of less than about 90 nm, less than about 80 nm, less than about 70 nm, or less than about 60 nm after heating at 90° C. in seawater for 7 days when they are at a concentration of about 100 parts per million (ppm) to about 2,000 ppm.

The coated nanoparticles of the composition can have a hydrodynamic diameter that is less than the hydrodynamic diameter of similar coated nanoparticles in a similar composition without the ion. For example, the coated nanoparticles of the composition can have a hydrodynamic diameter that is less than the hydrodynamic diameter of similar coated nanoparticles in a similar composition without the ion after spending about 7 days in seawater at a temperature of about 90° C.

In some embodiments, the coated nanoparticles of the composition have a lower critical solution temperature of greater than about 90° C. For example, the coated nanoparticles of the composition have a lower critical solution temperature of greater than about 90° C., about 95° C., about 100° C., or greater than about 110° C.

In some embodiments, the coated nanoparticles of the composition have a higher permeability as compared to similar coated nanoparticles in a similar composition without the ion. As used in this disclosure, the term "permeability," refers to the proportionality constant between the fluid flow rate and the applied pressure gradient. The particles of the composition can be more stable than particles a similar composition without the ion (e.g., calcium) and, thus, less aggregation takes place, preventing permeability reduction. Typically, decreases in reservoir permeability result from clogging of pores and reduced flow pathways.

The method can further include combining the composition with an aqueous fluid including a drilling fluid, a stimulation fluid, a fracturing fluid, a spotting fluid, a clean-up fluid, a completion fluid, a remedial treatment fluid, an abandonment fluid, a pill, an acidizing fluid, a cementing fluid, a packer fluid, a logging fluid, or a combination thereof, to form a mixture, in which the placing the composition in the subterranean formation includes placing the mixture in the subterranean formation. The term aqueous fluid can include W/O (water-in-oil) emulsions and W/O/W (water-in-oil-in-water) emulsions.

In some embodiments, at least one of prior to, during, and after the placing of the composition in the subterranean formation, the composition is used in the subterranean formation, at least one of alone and in combination with other materials, as a drilling fluid, a stimulation fluid, a fracturing fluid, a spotting fluid, a clean-up fluid, a completion fluid, a remedial treatment fluid, an abandonment fluid, a pill, an acidizing fluid, a cementing fluid, a packer fluid, a logging fluid, or a combination thereof.

The composition can further include a saline, a salt, an aqueous base, an oil (e.g., a synthetic fluid oil phase), an organic solvent, an aqueous solution, an alcohol or polyol (e.g., cellulose or starch), an alkalinity control agent, an acidity control agent, a density control agent, a density modifier, an emulsifier, a dispersant, a polymeric stabilizer, a crosslinking agent, a polyacrylamide, a polymer, an antioxidant, a heat stabilizer, a foam control agent, a diluent, a plasticizer, a filler or inorganic particle, a pigment, a dye, a precipitating agent, a rheology modifier, a oil-wetting agent, a weight reducing additive, a heavy-weight additive, a set retarding additive, a surfactant, a corrosion inhibitor, a gas, a lost circulation material, a filtration control additive, a fiber, a thixotropic additive, a breaker, a curing accelerator, a curing retarder, a pH modifier, a chelating agent, a scale inhibitor, an enzyme, a resin, a water control material, an oxidizer, a marker, a Portland cement, a pozzolana cement, a gypsum cement, a high alumina content cement, a slag cement, a silica cement, a fly ash, a metakaolin, shale, a zeolite, a crystalline silica compound, an amorphous silica, fibers, a hydratable clay, a microsphere, a pozzolan lime, or a combination thereof.

In some embodiments, the composition further includes a proppant, a resin-coated proppant, or a combination thereof.

The method can further includes processing the composition exiting the annulus with at least one fluid processing unit to generate a cleaned composition and recirculating the cleaned composition through the wellbore.

Also provided in this disclosure is a method of treating a subterranean formation, the method including placing in a subterranean formation a nanoparticle composition including (i) a coated nanoparticle including (a) an iron oxide nanoparticle and (b) a cross-linked carbohydrate-based coating including dextran, pentaerythritol glycidyl ether, and 2-amino-2-hydroxymethyl-propane-1,3-diol; and (ii) an ion including $Ca^{2+}$, in which the dextran is cross-linked by pentaerythritol glycidyl ether.

Composition

Also provided in this disclosure, is a nanoparticle composition for treatment of a subterranean formation, the nanoparticle composition including (i) a coated nanoparticle including a nanoparticle and a cross-linked carbohydrate-based coating, and (ii) an ion selected from the group consisting of $Li^+$, $Na^+$, $K^+$, $Rb^+$, $Cs^+$, $Be^{2+}$, $Mg^{2+}$, $Ca^{2+}$, $Sr^{2+}$, $Ba^{2+}$, and mixtures thereof. The composition can further include a downhole fluid.

Also provided in this disclosure, is a composition for treatment of a subterranean formation, the composition including (i) a coated nanoparticle including an iron oxide nanoparticle and a cross-linked carbohydrate-based coating including dextran, pentaerythritol glycidyl ether, and 2-amino-2-hydroxymethyl-propane-1,3-diol in which the dextran is cross-linked by pentaerythritol glycidyl ether and (ii) an ion including $Ca^{2+}$.

Other Components

The composition including the (i) coated nanoparticle including the nanoparticle and the cross-linked carbohydrate-based coating and (ii) the ion selected from the group consisting of $Li^+$, $Na^+$, $K^+$, $Rb^+$, $Cs^+$, $Be^{2+}$, $Mg^{2+}$, $Ca^{2+}$, $Sr^{2+}$, $Ba^{2+}$, and mixtures thereof, can further include one or more suitable components. The additional components can be any components, such that the composition can be used as described in this disclosure.

In some embodiments, the composition includes one or more viscosifiers. The viscosifier can be any suitable viscosifier. The viscosifier can affect the viscosity of the composition or a solvent that contacts the composition at any suitable time and location. In some embodiments, the viscosifier provides an increased viscosity at least one of before injection into the subterranean formation, at the time of injection into the subterranean formation, during travel through a tubular disposed in a borehole, once the composition reaches a particular subterranean location, or some period of time after the composition reaches a particular subterranean location. In some embodiments, the viscosifier can be about 0.0001 wt % to about 10 wt % of the composition.

The viscosifier can include at least one of a linear polysaccharide, and poly(($C_2$-$C_{10}$)alkenylene), in which at each occurrence, the ($C_2$-$C_{10}$)alkenylene is independently substituted or unsubstituted. In some embodiments, the viscosifier can include at least one of poly(acrylic acid) or (C1-C5)alkyl esters thereof, poly(methacrylic acid) or (C1-C5)alkyl esters thereof, poly(vinyl acetate), poly(vinyl alcohol), poly(ethylene glycol), poly(vinyl pyrrolidone), polyacrylamide, poly (hydroxyethyl methacrylate), alginate, chitosan, curdlan, dextran, emulsan, gellan, glucuronan, N-acetyl-glucosamine, N-acetyl-heparosan, hyaluronic acid, kefiran, lentinan, levan, mauran, pullulan, scleroglucan, schizophyllan, stewartan, succinoglycan, xanthan, welan, derivatized starch, tamarind, tragacanth, guar gum, derivatized guar (for example, hydroxypropyl guar, carboxy methyl guar, or carboxymethyl hydroxylpropyl guar), gum ghatti, gum arabic, locust bean gum, and derivatized cellulose (for example, carboxymethyl cellulose, hydroxyethyl cellulose, carboxymethyl hydroxyethyl cellulose, hydroxypropyl cellulose, or methyl hydroxyl ethyl cellulose).

The viscosifier can include a poly(vinyl alcohol) homopolymer, poly(vinyl alcohol) copolymer, a crosslinked poly (vinyl alcohol) homopolymer, and a crosslinked poly(vinyl alcohol) copolymer. The viscosifier can include a poly(vinyl alcohol) copolymer or a crosslinked poly(vinyl alcohol) copolymer including at least one of a graft, linear, branched, block, and random copolymer of vinyl alcohol and at least one of a substituted or unsubstituted ($C_2$-$C_{50}$)hydrocarbyl having at least one aliphatic unsaturated C—C bond therein, and a substituted or unsubstituted ($C_2$-$C_{50}$)alkene. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl phosphonic acid, vinylidene diphosphonic acid, substituted or unsubstituted 2-acrylamido-2-methylpropanesulfonic acid, a substituted or unsubstituted ($C_1$-$C_{20}$)alkenoic acid, propenoic acid, butenoic acid, pentenoic acid, hexenoic acid, octenoic acid, nonenoic acid, decenoic acid, acrylic acid, methacrylic acid, hydroxypropyl acrylic acid, acrylamide, fumaric acid, methacrylic acid, hydroxypropyl acrylic acid, vinyl phosphonic acid, vinylidene diphosphonic acid, itaconic acid, crotonic acid, mesoconic acid, citraconic acid, styrene sulfonic acid, allyl sulfonic acid, methallyl sulfonic acid, vinyl sulfonic acid, and a substituted or unsubstituted ($C_1$-$C_{20}$) alkyl ester thereof. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl acetate, vinyl propanoate, vinyl butanoate, vinyl pentanoate, vinyl hexanoate, vinyl 2-methyl butanoate, vinyl 3-ethylpentanoate, and vinyl 3-ethylhexanoate, maleic anhydride, a substituted or unsubstituted ($C_1$-$C_{20}$)alkenoic substituted or unsubstituted ($C_1$-$C_{20}$)alkanoic anhydride, a substituted or unsubstituted ($C_1$-$C_{20}$)alkenoic substituted or unsubstituted ($C_1$-$C_{20}$)alkenoic anhydride, propenoic acid anhydride, butenoic acid anhydride, pentenoic acid anhydride, hexenoic acid anhydride, octenoic acid anhydride, nonenoic acid anhydride, decenoic acid anhydride, acrylic acid anhydride, fumaric acid anhydride, methacrylic acid anhydride, hydroxypropyl acrylic acid anhydride, vinyl phosphonic acid anhydride, vinylidene diphosphonic acid anhydride, itaconic acid anhydride, crotonic acid anhydride, mesoconic acid anhydride, citraconic acid anhydride, styrene sulfonic acid anhydride, allyl sulfonic acid anhydride, methallyl sulfonic acid anhydride, vinyl sulfonic acid anhydride, and an N—($C_1$-$C_{10}$)alkenyl nitrogen containing substituted or unsubstituted ($C_1$-$C_{10}$)heterocycle. The viscosifier can include a poly(vinyl alcohol) copolymer or a crosslinked poly(vinyl alcohol) copolymer including at least one of a graft, linear, branched, block, and random copolymer that includes a poly(vinylalcohol)-poly(acrylamide) copolymer, a poly(vinylalcohol)-poly(2-acrylamido-2-methylpropanesulfonic acid) copolymer, or a poly(vinylalcohol)-poly(N-vinylpyrrolidone) copolymer. The viscosifier can include a crosslinked poly(vinyl alcohol) homopolymer or copolymer including a crosslinker including at least one of an aldehyde, an aldehyde-forming compound, a carboxylic acid or an ester thereof, a sulfonic acid or an ester thereof, a phosphonic acid or an ester thereof, an acid anhydride, and an epihalohydrin.

The composition can further include a crosslinker. The crosslinker can be any suitable crosslinker. The crosslinker can be present in any suitable concentration, such as more, less, or an equal concentration as compared to the concentration of the crosslinker. The crosslinker can include at least one of boric acid, borax, a borate, a (C1-C30)hydrocarbylboronic acid, a (C1-C30)hydrocarbyl ester of a (C1-C30) hydrocarbylboronic acid, a (C1-C30)hydrocarbylboronic acid-modified polyacrylamide, ferric chloride, disodium octaborate tetrahydrate, sodium metaborate, sodium diborate, sodium tetraborate, disodium tetraborate, a pentaborate, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, titanium acetylacetonate, aluminum lactate, and aluminum citrate. The composition can include any suitable proportion of the crosslinker, such as about 0.1 wt % to about 50 wt %, or about 0.1 wt % to about 20 wt %, or about 0.001 wt %, 0.01, 0.1, 1, 2, 3, 4, 5, 10, 15, 20, 30, 40, 50, 60, 70, 80, 85, 90, 91, 92, 93, 94, 95, 96, 97, 98, or about 99 wt % or more of the composition.

In some embodiments, the composition, or a mixture including the same, can include any suitable amount of any suitable material used in a downhole fluid. For example, the composition or a mixture including the same can include water, saline, aqueous base, acid, oil, organic solvent, synthetic fluid oil phase, aqueous solution, alcohol or polyol, cellulose, starch, alkalinity control agents, acidity control agents, density control agents, density modifiers, emulsifiers, dispersants, polymeric stabilizers, crosslinking agents, polyacrylamide, a polymer or combination of polymers, antioxidants, heat stabilizers, foam control agents, solvents, diluents, plasticizer, filler or inorganic particle, pigment, dye, precipitating agent, rheology modifier, oil-wetting agents, set retarding additives, surfactants, gases, weight reducing additives, heavy-weight additives, lost circulation materials, filtration control additives, fibers, thixotropic additives, breakers, crosslinkers, rheology modifiers, curing accelerators, curing retarders, pH modifiers, chelating agents, scale inhibitors, enzymes, resins, water control materials, oxidizers, markers, Portland cement, pozzolana cement, gypsum cement, high alumina content cement, slag cement, silica cement, fly ash, metakaolin, shale, zeolite, a crystalline silica compound, amorphous silica, hydratable clays, microspheres, lime, or a combination thereof.

A drilling fluid, also known as a drilling mud or simply "mud," is a specially designed fluid that is circulated through a wellbore as the wellbore is being drilled to facilitate the drilling operation. The drilling fluid can be water-based or oil-based. The drilling fluid can carry cuttings up from beneath and around the bit, transport them up the annulus, and allow their separation. Also, a drilling fluid can cool and lubricate the drill head as well as reduce friction between the drill string and the sides of the hole. The drilling fluid aids in support of the drill pipe and drill head, and provides a hydrostatic head to maintain the integrity of the wellbore walls and prevent well blowouts. Specific drilling fluid systems can be selected to optimize a drilling operation in accordance with the characteristics of a particular geological formation. The drilling fluid can be formulated to prevent unwanted influxes of formation fluids from permeable rocks and also to form a thin, low permeability filter cake that temporarily seals pores, other openings, and formations penetrated by the bit. In water-based drilling fluids, solid particles are suspended in a water or brine solution containing other components. Oils or other non-aqueous liquids can be emulsified in the water or brine or at least partially solubilized (for less hydrophobic non-aqueous liquids), but water is the continuous phase. A drilling fluid can be present in the mixture with the composition including the crosslinkable ampholyte polymer and the crosslinker, or a crosslinked reaction product thereof, in any suitable amount, such as about 1 wt % or less, about 2 wt %, 3, 4, 5, 10, 15, 20, 30, 40, 50, 60, 70, 80, 85, 90, 95, 96, 97, 98, 99, 99.9, 99.99, 99.999, or about 99.999.9 wt % or more of the mixture.

A water-based drilling fluid in methods provided in this disclosure can be any suitable water-based drilling fluid. In some embodiments, the drilling fluid can include at least one of water (fresh or brine), a salt (for example, calcium chloride, sodium chloride, potassium chloride, magnesium chloride, calcium bromide, sodium bromide, potassium bromide, calcium nitrate, sodium formate, potassium formate, cesium formate), aqueous base (for example, sodium hydroxide or potassium hydroxide), alcohol or polyol, cellulose, starches, alkalinity control agents, density control agents such as a density modifier (for example, barium sulfate), surfactants (for example, betaines, alkali metal alkylene acetates, sultaines, ether carboxylates), emulsifiers, dispersants, polymeric stabilizers, crosslinking agents, polyacrylamides, polymers or combinations of polymers, antioxidants, heat stabilizers, foam control agents, foaming agents, solvents, diluents, plasticizers, filler or inorganic particles (for example, silica), pigments, dyes, precipitating agents (for example, silicates or aluminum complexes), and rheology modifiers such as thickeners or viscosifiers (for example, xanthan gum). Any ingredient listed in this paragraph can be either present or not present in the mixture.

An oil-based drilling fluid or mud in methods provided in this disclosure can be any suitable oil-based drilling fluid. In some embodiments the drilling fluid can include at least one of an oil-based fluid (or synthetic fluid), saline, aqueous solution, emulsifiers, other agents of additives for suspension control, weight or density control, oil-wetting agents, fluid loss or filtration control agents, and rheology control agents. For example, see H. C. H. Darley and George R. Gray, *Composition and Properties of Drilling and Completion Fluids* 66-67, 561-562 (5th ed. 1988). An oil-based or invert emulsion-based drilling fluid can include between about 10:90 to about 95:5, or about 50:50 to about 95:5, by volume of oil phase to water phase. A substantially all oil mud includes about 100% liquid phase oil by volume (for example, substantially no internal aqueous phase).

A pill is a relatively small quantity (for example, less than about 500 bbl, or less than about 200 bbl) of drilling fluid used to accomplish a specific task that the regular drilling fluid cannot perform. For example, a pill can be a high-viscosity pill to, for example, help lift cuttings out of a vertical wellbore. In another example, a pill can be a freshwater pill to, for example, dissolve a salt formation. Another example is a pipe-freeing pill to, for example, destroy filter cake and relieve differential sticking forces. In another example, a pill is a lost circulation material pill to, for example, plug a thief zone. A pill can include any component described in this disclosure as a component of a drilling fluid.

A cement fluid can include an aqueous mixture of at least one of cement and cement kiln dust. The composition including the crosslinkable ampholyte polymer and the crosslinker, or a crosslinked reaction product thereof, can form a useful combination with cement or cement kiln dust. The cement kiln dust can be any suitable cement kiln dust. Cement kiln dust can be formed during the manufacture of cement and can be partially calcined kiln feed that is removed from the gas stream and collected in a dust collector during a manufacturing process. Cement kiln dust can be advantageously utilized in a cost-effective manner since kiln dust is often regarded as a low value waste product of the cement industry. Some embodiments of the cement fluid can include cement kiln dust but no cement, cement kiln dust and cement, or cement but no cement kiln dust. The cement can be any suitable cement. The cement can be a hydraulic cement. A variety of cements can be utilized in accordance with embodiments of the methods described in this disclosure; for example, those including calcium, aluminum, silicon, oxygen, iron, or sulfur, which can set and harden by reaction with water. Suitable cements can include Portland cements, pozzolana cements, gypsum cements, high alumina content cements, slag cements, silica cements, and combinations thereof. In some embodiments, the Portland cements that are suitable for use in embodiments of the methods described in this disclosure are classified as Classes A, C, H, and G cements according to the American Petroleum Institute, *API Specification for Materials and Testing for Well Cements*, API Specification 10, Fifth Ed., Jul. 1, 1990. A cement can be generally included in the cementing fluid in an amount sufficient to provide the desired compressive strength, density, or cost. In some embodiments, the hydraulic cement can be present in the cementing fluid in an amount in the range of from 0 wt % to about 100 wt %, 0-95 wt %, 20-95 wt %, or about 50-90 wt %. A cement kiln dust can be present in an amount of at least about 0.01 wt %, or about 5 wt %-80 wt %, or about 10 wt % to about 50 wt %.

Optionally, other additives can be added to a cement or kiln dust-containing composition of embodiments of the methods described in this disclosure as deemed appropriate by one skilled in the art, with the benefit of this disclosure. Any optional ingredient listed in this paragraph can be either present or not present in the composition. For example, the composition can include fly ash, metakaolin, shale, zeolite, set retarding additive, surfactant, a gas, accelerators, weight reducing additives, heavy-weight additives, lost circulation materials, filtration control additives, dispersants, and combinations thereof. In some examples, additives can include crystalline silica compounds, amorphous silica, salts, fibers, hydratable clays, microspheres, pozzolan lime, thixotropic additives, combinations thereof, and the like.

The composition or mixture can further include a proppant, a resin-coated proppant, an encapsulated resin, or a combination thereof. A proppant is a material that keeps an induced hydraulic fracture at least partially open during or after a fracturing treatment. Proppants can be transported into the subterranean formation and to the fracture using fluid, such as fracturing fluid or another fluid. A higher-viscosity fluid can more effectively transport proppants to a desired location in a fracture, especially larger proppants, by more effectively keeping proppants in a suspended state within the fluid. Examples of proppants can include sand, gravel, glass beads, polymer beads, ground products from shells and seeds such as walnut hulls, and manmade materials such as ceramic proppant, bauxite, tetrafluoroethylene materials (for example, TEFLON™ available from DuPont), fruit pit materials, processed wood, composite particulates prepared from a binder and fine grade particulates such as silica, alumina, fumed silica, carbon black, graphite, mica, titanium dioxide, meta-silicate, calcium silicate, kaolin, talc, zirconia, boron, fly ash, hollow glass microspheres, and solid glass, or mixtures thereof. In some embodiments, proppant can have an average particle size, in which particle size is the largest dimension of a particle, of about 0.001 mm to about 3 mm, about 0.15 mm to about 2.5 mm, about 0.25 mm to about 0.43 mm, about 0.43 mm to about 0.85 mm, about 0.85 mm to about 1.18 mm, about 1.18 mm to about 1.70 mm, or about 1.70 to about 2.36 mm. In some embodiments, the proppant can have a distribution of particle sizes clustering around multiple averages, such as one, two, three, or four different average particle sizes. The composition or mixture can include any suitable amount of proppant, such as about 0.0001 wt % to about 99.9 wt %, about 0.1 wt % to about 80 wt %, or about 10 wt % to about 60 wt %, or about 0.00000001 wt % or less, or about 0.000001 wt %, 0.0001, 0.001, 0.01, 0.1, 1, 2, 3, 4, 5, 10, 15, 20, 30, 40, 50, 60, 70, 80, 85, 90, 91, 92, 93, 94, 95, 96, 97, 98, 99, 99.9 wt %, or about 99.99 wt % or more.

System or Apparatus

Also provided in this disclosure, is a system including a nanoparticle composition including (i) a coated nanoparticle including a nanoparticle and a cross-linked carbohydrate-based coating, and (ii) an ion selected from the group consisting of $Li^+$, $Na^+$, $K^+$, $Rb^+$, $Cs^+$, $Be^{2+}$, $Mg^{2+}$, $Ca^{2+}$, $Sr^{2+}$, $Ba^{2+}$, and mixtures thereof; and (iii) a subterranean formation including the composition therein.

In some embodiments, the composition in the system can also include a downhole fluid, or the system can include a mixture of the composition and downhole fluid. In some embodiments, the system can include a tubular, and a pump configured to pump the composition into the subterranean formation through the tubular.

Various embodiments provide systems and apparatus configured for delivering the composition described in this disclosure to a subterranean location and for using the composition therein, such as for drilling or hydraulic fracturing. In some embodiments, the system can include a pump fluidly coupled to a tubular (for example, any suitable type of oilfield pipe, such as pipeline, drill pipe, production tubing, and the like), the tubular containing a composition including the coated nanoparticle and the ion, described in this disclosure.

In some embodiments, the system can include a drillstring disposed in a wellbore, the drillstring including a drill bit at a downhole end of the drillstring. The system can include an annulus between the drillstring and the wellbore. The system can also include a pump configured to circulate the composition through the drill string, through the drill bit, and back above-surface through the annulus. The system can include a fluid processing unit configured to process the composition exiting the annulus to generate a cleaned drilling fluid for recirculation through the wellbore.

EXAMPLES

Example 1.1 Syntheses and Characterization

Figure 2:
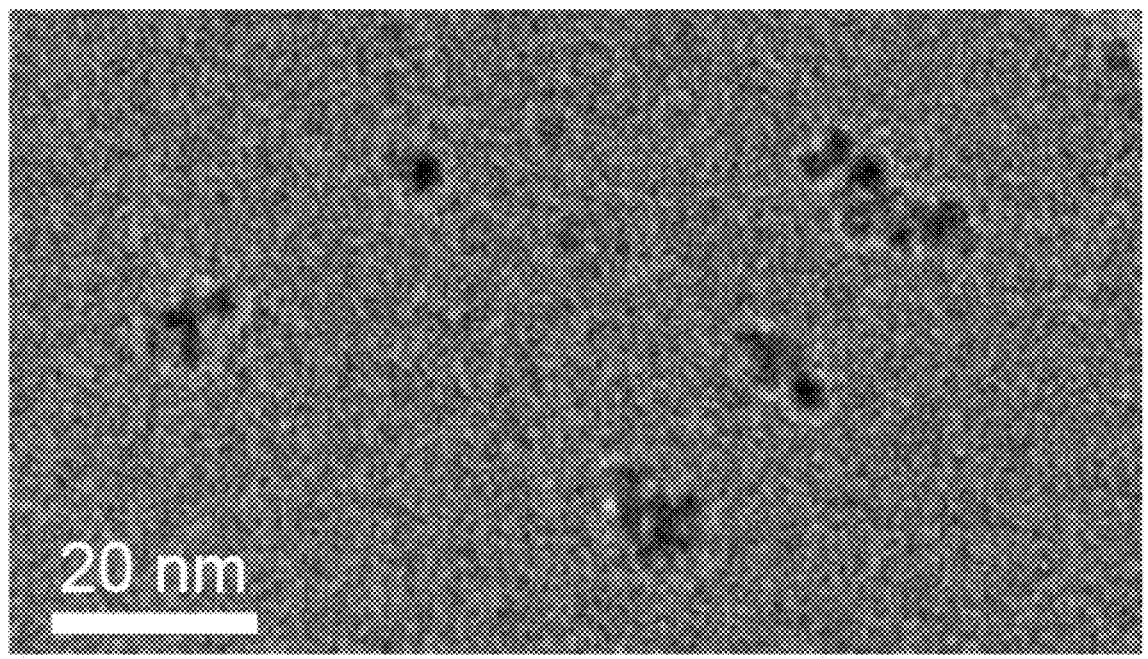
FIG. 2 shows a Cryo-transmission electron microscopy (TEM) image of dextran coated superparamagnetic nanoparticles, as provided in this disclosure.
Figure 3:
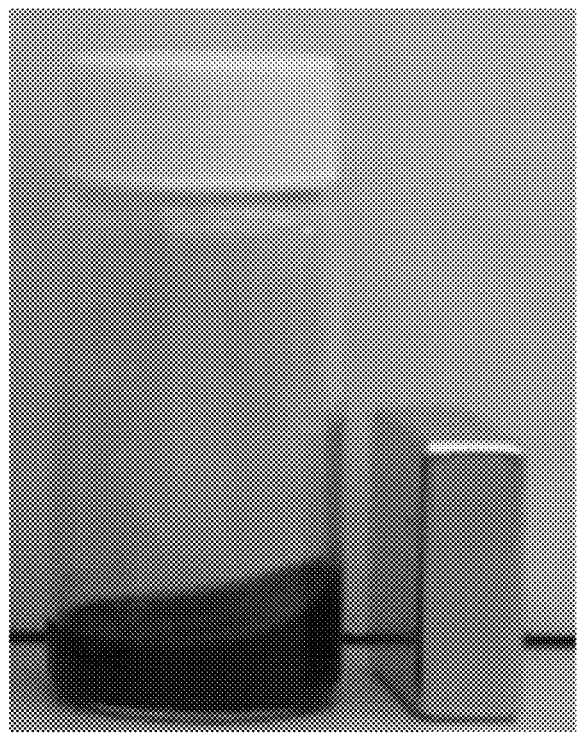
FIG. 3 shows an optical micrograph depicting response of an aqueous suspension of dextran coated superparamagnetic nanoparticles exposed to an external magnetic field, as provided in this disclosure.

Polysaccharide-coated iron oxide nanoparticles were synthesized using the cold-gelation approach. In this approach, 1.35 g (grams) (0.005 moles) of $FeCl_3 \cdot 6H_2O$ was dissolved in 50 mL (milliliters) of deionized water. To this solution was added 3.0 g of 90,000 MW dextran (branched polysaccharide). After addition, the reaction was cooled to 5° C. through the use of an ice water bath and subsequently deoxygenated through the use of an $N_2$ purge. This deoxygenation/cooling cycle was applied for 30 minutes while vigorously stirring the reaction vessel with a magnetic stir bar. After 30 minutes, 0.54 g (0.0027 moles) of $FeCl_2.4H_2O$ dissolved in 5 mL of deionized water was added to the vessel. The mixture was allowed to stir under an $N_2$ atmosphere for an additional 10 minutes. Next, 3 mL of concentrated aqueous $NH_3$ solution was added dropwise to the solution over a period of 15 minutes. During the addition, the reaction color changed from orange to dark brown/black. After completion of addition, the reaction was heated to 80° C. for 45 minutes. After heating, the reaction was allowed to cool to room temperature. The resulting particles were coated non-covalently with a dextran sheath. Crosslinking can ensure the coating remains intact during subterranean operations. In order to facilitate crosslinking, 2 mL of pentaerythritol glycidyl ether was added to 200 mL of 1M (molar) NaOH (aq.) and 400 mg of $NaBH_4$ in a round bottom flask. The crude nanoparticle solution was transferred to an addition funnel, which was subsequently mounted to the round bottom flask containing the crosslinking formulation. The nanoparticle solution (55 mL) was added dropwise over a period of approximately 1 hour to the vigorously stirring crosslinking solution. The reaction was allowed to proceed at room temperature for 24 hours. Upon completion of the 24 hour reaction period, 20 mL of 2M 2-amino-2-hydroxymethyl-propane-1,3-diol was added to the crude mixture to quench any unreacted crosslinker present in the medium. This reaction was allowed to proceed for 12 hours. Upon completion, the reaction was purified via tangential flow filtration (100,000 MWCO filter) to provide a purified nanoparticle solution. The dynamic light scattering results for the as synthesized materials along with TEM images are shown in FIG. 1 and FIG. 2. FIG. 2 shows a Cryo-TEM image of the synthesized dextran coated superparamagnetic nanoparticles. FIG. 3 shows an optical micrograph depicting response of an aqueous suspension of the synthesized dextran coated superparamagnetic nanoparticles exposed to an external magnetic field.

Example 1.2 Formulation Fluids Containing Polysaccharide Coated Nanoparticles

Nanoparticle formulations can be injected into subterranean formations using seawater. The composition of seawater used in Saudi Aramco oil field operations (along with the composition of reservoir brine) is displayed in Table 1.

TABLE 1

| Salt | Seawater | LS Arab-D (g/L) |
| --- | --- | --- |
| NaCl | 41.042 | 74.59 |
| $CaCl_2 \cdot 2\ H_2O$ | 2.385 | 49.79 |
| $MgCl_2 \cdot 6\ H_2O$ | 17.645 | 13.17 |
| $BaCl_2$ | 0.00 | 0.01 |
| $Na_2SO_4$ | 6.343 | 0.6 |
| $NaHCO_3$ | 0.165 | 0.51 |
| TDS | about 60,000 ppm | about 120,000 ppm |

Figure 4:
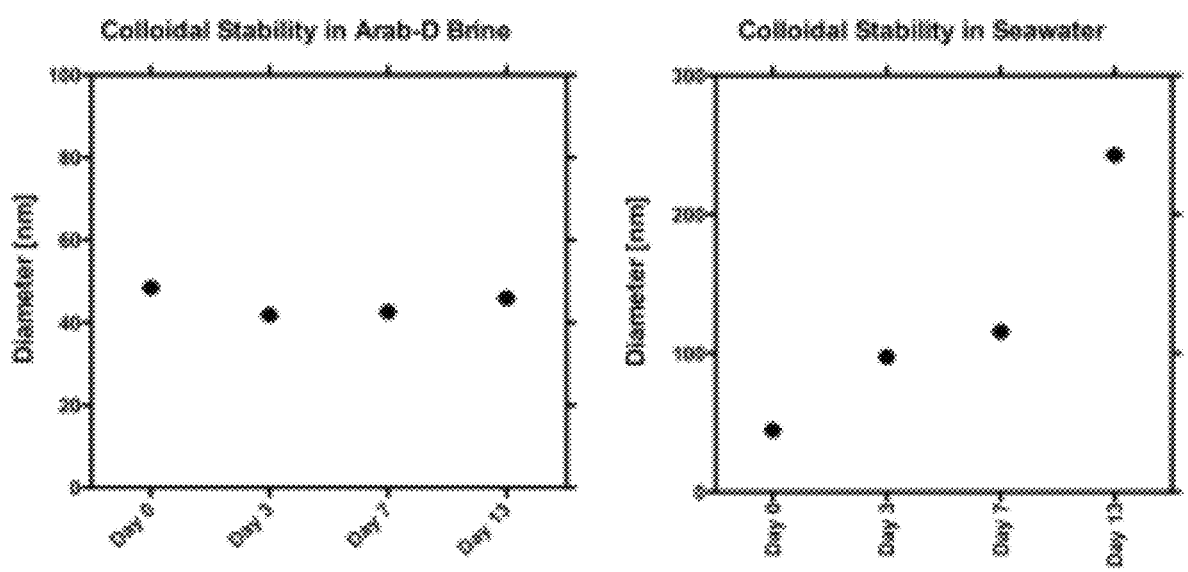
FIG. 4 shows the dynamic light scattering results of polysaccharide coated nanoparticles in LS Arab-D brine (left) and seawater (right) after heating at 90° C. for the specified period of time.

Seawater possesses a lower overall total dissolved salt (TDS) content compared to the formation water that exists in the subterranean environment. Further, salinity tends to decrease the colloidal stability of nanoparticles leading to flocculation and sedimentation. This process is described by Derjaguin, Landau, Verwey and Overbeek (DLVO) theory, which predicts that an increase in salinity will effectively screen any surface charges present in the double layer of a nanoparticle and significantly decrease any nanoparticle-nanoparticle repulsive forces that would otherwise keep the particles suspended in solution. In addition, high salinity fluids exhibit higher surface tensions compared to deionized water. This increase in surface tension destabilizes the nanoparticles by increasing the free energy of hydration. Based on this understanding, it was unexpectedly found that the nanoparticles described in Part I are significantly more stable in reservoir brine (LS Arab-D brine) compared to the lower salinity seawater. This counterintuitive observation is exemplified in FIG. 4, which shows dynamic light scattering results of polysaccharide coated nanoparticles in LS Arab-D brine (left) and seawater (right) after heating at 90° C. for the specified period of time. The increase in hydrodynamic diameter in seawater is indicative of particle aggregation.

Figure 5:
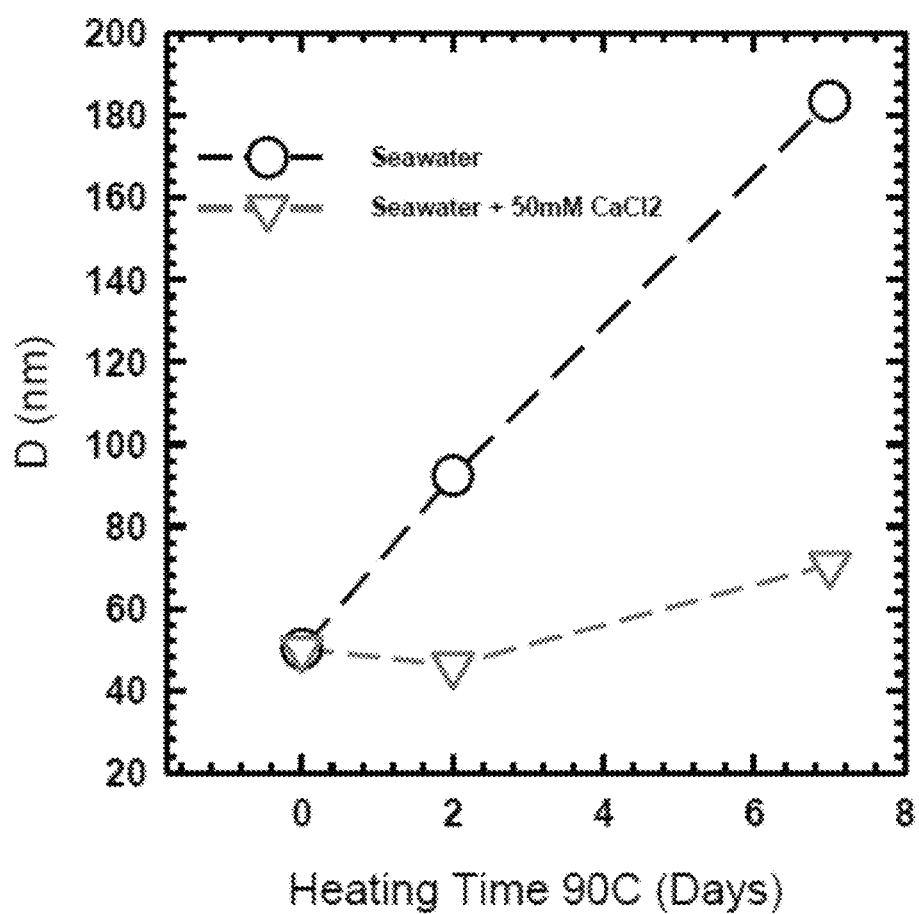
FIG. 5 shows the hydrodynamic diameter (D) of polysaccharide coated nanoparticles as a function of heating at 90° C. in seawater and seawater doped with 50 mM $CaCl_2$), as provided in this disclosure.

A saturated seawater sample was prepared with $CaCl_2$ (50 mM) and 500 ppm of the nanoparticles described previously in Example 1.1. A control experiment was also setup using standard seawater. Both experiments were heated at 90° C. for 7 days and monitored visually for flocculation as well as via dynamic light scattering (DLS). The results of this experiment are displayed in FIG. 5. FIG. 5 shows the hydrodynamic diameter (D) of polysaccharide coated nanoparticles as a function of heating at 90° C. in seawater and seawater doped with 50 mM $CaCl_2$.

Figure 6:
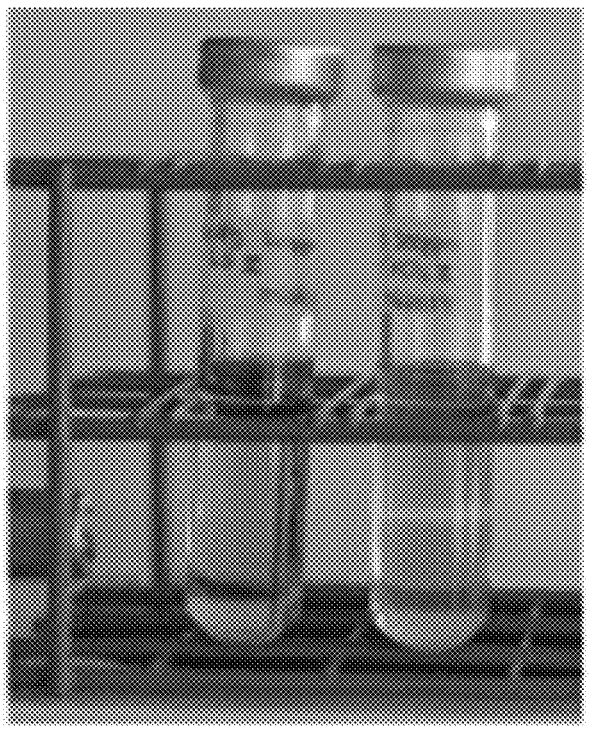
FIG. 6 shows an optical micrograph depicting the impact of calcium ion removal on the colloidal stability of polysaccharide coated nanoparticles, as provided in this disclosure.

The results demonstrate the mitigating effects of calcium on the observed nanoparticle instabilities in seawater. To further test this, calcium was removed from the reservoir brine (LS Arab D) and left all other components unchanged. To this solution was added 500 ppm of nanoparticles and the experiment was heated to 90° C. A control sample was prepared using standard reservoir brine (LS Arab D) containing calcium ions. The results are depicted in FIG. 6. FIG. 6 shows optical micrograph depicting the impact of calcium ion removal on the colloidal stability of polysaccharide coated nanoparticles. 500 ppm of polysaccharide coated nanoparticles were injected into standard reservoir brine (left) and reservoir brine without calcium ions (right), both systems were heated to 90° C. for 7 days. A red laser pointer was used to exemplify the increase in scattering intensity due to particle aggregation in the absence of calcium ions. Through the removal of calcium, the nanoparticles are rendered unstable and begin to aggregate as indicated by the increased scattering of the red laser and the increase in hydrodynamic diameter as measured by dynamic light scattering. These results clearly indicate the synergistic interaction between calcium ions and polysaccharide coated nanomaterials. By doping seawater injection fluids with low concentrations (50 mM) of calcium salts, formulations of stable nanomaterial suspensions for use in subterranean applications were created.

Example 1.3 Nanoparticle Transport Through Porous Media

Porous media. For columns packed with crushed rock, 70 millidarcy (mD) Indiana Limestone cores were purchased from Korcurek Industries (carbonate similar to Arab-D rock), crushed, and then sieved to produce powders of known grain sizes. Grain sizes of >250 micrometer (um), 150-250 um, 106-150 um, and 45-106 um are the available options from the sieving process. Prior to column packing the porous rock fines are mixed with the planned testing fluid (low salinity brine (B), seawater (SW), or deionized water (DI)) and placed in a vacuum chamber at −10 pound per square inch (psi) overnight to degas and subsequent rinsing steps are used to remove any muddy residue. For all data shown here the grain size of 150-250 um was used.

Column, tubing, and electronics. Stainless steel tubing (OD=¼", 55 mm long) and reducing fittings (¼" to ¹⁄₁₆") were purchased from Swagelok. Teflon tubing (0.040" ID, Scientific Commodities, Inc.) was used to connect the flow from the syringe pump (Harvard Apparatus, Inc.) to the column and to the pressure gauge (50 psi wet/dry differential, Omega Engineering, Inc.). At the effluent side of the column a course filter set is inserted prior to column packing to retain the porous media but allow nanoparticle passage. The course filter consists of a 5 mm Viton O-ring (McMaster-Carr), 5 mm 0.75" 316 Stainless steel mesh (McMaster-Carr), 5 mm Cyclopore Track Etched Membrane (Whatman, Inc), another 5 mm 0.75" 316 Stainless Steel Mesh, and a final 5 mm Viton O-ring.

Column packing. A wet/dry column packing method was chosen to ensure consistent and tight column packing with the wet degassed crushed rock. Briefly, a vacuum hose is connected to the outlet of the column with the filter set in place between the bottom of the ¼" stainless steel tubing and the ¼" to ¹⁄₁₆" reducing fitting. Then, the selected porous media was slowly added to the column while alternating with the fluid phase. The column was gently tapped and then pressed using a plunger to ensure even and tight packing. This process was repeated several times until the column was full and suction from the vacuum no longer pulled the fluid quickly through the column.

Experimental procedure. The ¼" to ¹⁄₁₆" reducing fitting was then attached the top for the column. The column was first rinsed with ~30 mL of the test fluid (deionized water or brine) to ensure a saturated column and to measure the pressure drop across the column (and permeability). Next a continuous injection of nanoparticles at 1250 ppm was pumped into the column at a known flow rate and fractions (~1-3 pore volumes (PV) each) were collected at the effluent starting when the nanoparticles reached the top of the packed column. For each experimental run, 3 mL (~10 PV) of the particle solution was injected. Finally, the nanoparticle solution was replaced by a flush fluid (deionized water or brine) containing no nanoparticles and fractions were collected until >20 PV appeared transparent and contained no nanoparticles.

Characterization. Nanoparticle concentration in the collected volume fractions was determined using UV-VIS absorbance (Shimadzu) based on the Beer-Lambert Law (Eq. 1).

$$A = \alpha l C \quad (1)$$

Figure 7:
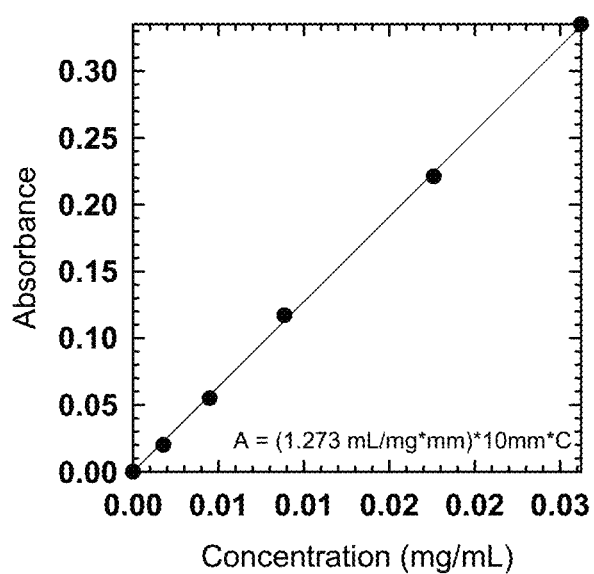
FIG. 7 shows a concentration versus absorbance calibration curve for superparamagnetic nanoparticles at 388 nm, as provided in this disclosure

Where, A is the absorbance, α is the absorbtivity (mL/(mg*mm)), l is the path length (mm) and C is the concentration (mg/mL). For the superparamagnetic nanoparticles the absorbance was tested 388 nm. Prior to measuring the absorbance of the collected fractions, a calibration curve was produced to measure a (see FIG. 7 for superparamagnetic nanoparticles).

In some cases the concentration of particles in the collected fraction was very high and led to the absorbance to be outside of the linear range measured for the calibration curve. For these fractions a dilution was performed such that the absorbance was within the necessary range and then the reported concentration and mass of nanoparticles was scaled to account for the dilution. For each cuvette the absorbance was measured and then converted to concentration in mg/mL and then to mass by multiplying by the volume of the collected fraction.

Finally, the permeability of the packed channel to the saturation fluid was measured using Darcy's law:

$$\kappa := \frac{v \cdot \mu \cdot h}{\Delta P} \quad (2)$$

Where κ is the permeability, μ is the viscosity, h is the column height, v is the flow rate in units distance/time (ft/day), and ΔP is the pressure drop.

After each run the column was placed in the oven to dry overnight and the packing material was recovered and weighed to get the porosity of the pack. The porosity was then used to calculate the pore volume.

Results. Three miniaturized coreflood tests for each flushing fluid were performed with the cross-linked dextran stabilized superparamagnetic nanoparticles at 1.25 mg/mL. The experimental parameters for all data sets are given in Table 2. The permeability reported is the permeability to each flushing fluid based on the measured pressure drop and flow rate by Eqn. 2. The permeability of the crushed rock columns was close to the core permeability reported by the vendor showing that the columns are well packed and closely resemble the structure of the whole cores. Lower values of permeability can be attributed to excess fines being released during crushing and filling the large pore space.

TABLE 2

| Fluid | % Recovery | Perm (mD) | Porosity (%) |
|---|---|---|---|
| DI | 86.4 | 58 | 28 |
| DI | 85.8 | 48 | 24 |
| DI | 82.8 | 45 | 24 |
| SW | 92.0 | 47 | 25 |
| SW | 85.2 | 49 | 21 |
| SW | 88.2 | 42 | 23 |
| B | 95.3 | 70 | 23 |
| B | 95.3 | 49 | 24 |
| B | 89.4 | 47 | 25 |

Figure 8:
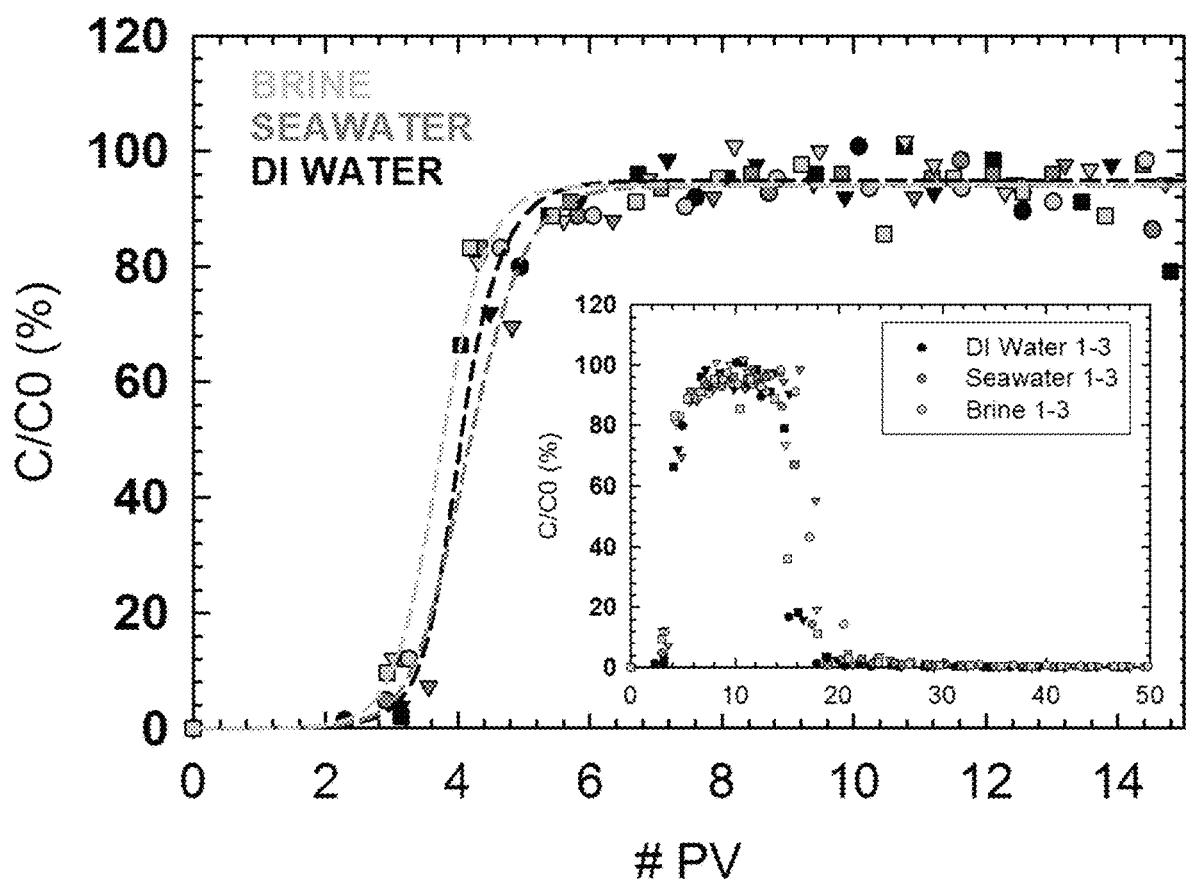
FIG. 8 shows the percent concentration of nanoparticles in the effluent stream normalized by the influent concentration for three experimental runs, as provided in this disclosure.
Figure 9:
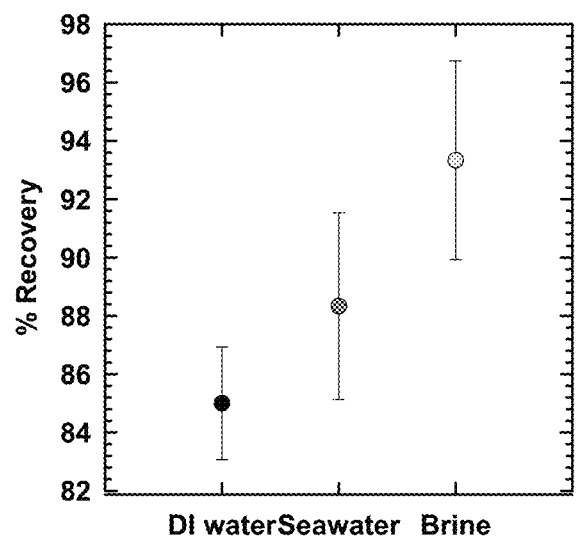
FIG. 9 shows percent recovery data demonstrating the effects of fluid type of nanoparticle recovery, as provided in this disclosure.

FIG. 8 shows the percent concentration of nanoparticles in the effluent stream normalized by the influent concentration for all three experimental runs. In each case the concentration of nanoparticles in the effluent stream reached that of the influent stream after more than 5 pore volumes of nanoparticles entered the packed column. This data along with the volume of the collected fractions is used to calculate the percentage of the total mass recovered in each fraction. The total mass is then calculated as the total of all fractions (FIG. 9 and Table 2).

These results show that the nanoparticles traverse the pore network of both a glass bead and crushed rock porous media and that they are stable in flowing low-salinity Arab-D brine, artificial seawater and deionized water at room temperature.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A nanoparticle composition for treatment of a subterranean formation, the nanoparticle composition comprising:
    a coated nanoparticle comprising a nanoparticle and a cross-linked carbohydrate-based coating, wherein the cross-linked carbohydrate-based coating is a reaction product of a quenching reaction between the cross-linked carbohydrate-based coating and an amine-functionalized compound that is 2-amino-2-hydroxymethyl-propane-1,3-diol, and
    an ion selected from the group consisting of $Li^+$, $Na^+$, $K^+$, $Rb^+$, $Cs^+$, $Be^{2+}$, $Mg^{2+}$, $Ca^{2+}$, $Sr^{2+}$, $Ba^{2+}$, and mixtures thereof.

2. The nanoparticle composition of claim 1, wherein the composition further comprises a downhole fluid.

3. The nanoparticle composition of claim 1, wherein the nanoparticle is a metal oxide nanoparticle selected from an iron oxide nanoparticle, a nickel oxide nanoparticle, and a cobalt oxide nanoparticle.

4. The nanoparticle composition of claim 1, wherein the nanoparticle comprises a metal oxide comprising an atom selected from the group consisting of Zn, Cr, Co, Dy, Er, Eu, Gd, Gd, Pr, Nd, In, Pr, Sm, Tb, Tm, and combinations thereof.

5. The nanoparticle composition of claim 1, wherein the nanoparticle is a superparamagnetic nanoparticle.

6. The nanoparticle composition of claim 5, wherein the superparamagnetic nanoparticle comprises an iron oxide nanoparticle.

7. The nanoparticle composition of claim 1, wherein the nanoparticle has an average particle size of about 10 nm to about 1,000 nm.

8. The nanoparticle composition of claim 1, wherein the cross-linked carbohydrate-based coating comprises a carbohydrate selected from the group consisting of a monosaccharide, an oligosaccharide, a polysaccharide, and combinations thereof.

9. The nanoparticle composition of claim 1, wherein the cross-linked carbohydrate-based coating comprises a polysaccharide.

10. The nanoparticle composition of claim 9, wherein the polysaccharide is dextran.

11. The nanoparticle composition of claim 10, wherein the dextran has a number average molecular weight of about 1,000 MW to about 150,000 MW.

12. The nanoparticle composition of claim 1, wherein the coated nanoparticle has a hydrodynamic diameter of about 10 nm to about 150 nm.

13. The nanoparticle composition of claim 1, wherein the coated nanoparticles of the composition have a hydrodynamic diameter of less than about 100 nm after heating at 90° C. in seawater for 7 days.

* * * * *

UNITED STATES PATENT AND TRADEMARK OFFICE
CERTIFICATE OF CORRECTION

Page 1 of 1

PATENT NO. : 10,836,953 B2
APPLICATION NO. : 16/375257
DATED : November 17, 2020
INVENTOR(S) : Jason R. Cox et al.

It is certified that error appears in the above-identified patent and that said Letters Patent is hereby corrected as shown below:

In the Specification

In Column 1, Line 9, delete "15/035,033," and insert -- 16/035,033, --, therefor.

In the Claims

In Column 27, Line 24, in Claim 4, delete "Gd, Gd," and insert -- Gd, --, therefor.

In Column 27, Line 24, in Claim 4, after "In," delete "Pr,".

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*